(12) United States Patent
Etzioni et al.

(10) Patent No.: US 8,566,143 B2
(45) Date of Patent: Oct. 22, 2013

(54) PERFORMING PREDICTIVE PRICING BASED ON HISTORICAL DATA

(75) Inventors: Oren Etzioni, Seattle, WA (US); Alexander Yates, Seattle, WA (US); Craig A. Knoblock, El Segundo, CA (US); Rattapoom Tuchinda, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/082,362

(22) Filed: Apr. 7, 2011

(65) Prior Publication Data

US 2011/0251917 A1    Oct. 13, 2011

Related U.S. Application Data

(63) Continuation of application No. 12/044,229, filed on Mar. 7, 2008, now Pat. No. 7,974,863, which is a continuation of application No. 11/352,420, filed on Feb. 10, 2006, now Pat. No. 7,346,520, which is a continuation of application No. 10/811,077, filed on Mar. 26, 2004, now Pat. No. 7,010,494.

(60) Provisional application No. 60/458,321, filed on Mar. 27, 2003.

(51) Int. Cl.
*G06Q 99/00* (2006.01)

(52) U.S. Cl.
USPC .................. 705/7.35; 705/1.1; 705/400

(58) Field of Classification Search
CPC ..................................... G06Q 10/087
USPC ........ 705/1.1, 7.35, 14.69, 400, 5, 7.31, 26.1, 705/26.41
See application file for complete search history.

(56) References Cited

U.S. PATENT DOCUMENTS

| 4,837,744 A | 6/1989 | Marquot |
| 4,922,439 A | 5/1990 | Greenblatt |

(Continued)

FOREIGN PATENT DOCUMENTS

| EP | 1148433 A1 | 10/2001 |
| JP | 2131012 A | 5/1990 |

(Continued)

OTHER PUBLICATIONS

Abe, Naoki and Kamba, Tomonari; "A Web Marketing System with Automatic Pricing", Jun. 2000, Computer Networks 33, 775-788.*

(Continued)

*Primary Examiner* — John Hayes
*Assistant Examiner* — Freda A Nelson
(74) *Attorney, Agent, or Firm* — Perkins Coie LLP

(57) ABSTRACT

Techniques are described for using predictive pricing information for items to assist in evaluating buying and/or selling decisions in various ways, such as on behalf of end-user item acquirers and/or intermediate item providers. The predictive pricing for an item may be based on an analysis of historical pricing information for that item and/or related items, and can be used to make predictions about future pricing information for the item. Such predictions may then be provided to users in various ways to enable comparison of current prices to predicted future prices. In some situations, predictive pricing information is used to assist customers when purchasing airline tickets and/or to assist travel agents when selling airline tickets. This abstract is provided to comply with rules requiring an abstract, and it is submitted with the intention that it will not be used to interpret or limit the scope or meaning of the claims.

15 Claims, 21 Drawing Sheets

(56) References Cited

U.S. PATENT DOCUMENTS

| | | | |
|---|---|---|---|
| 5,021,693 A | 6/1991 | Shima | |
| 5,237,499 A | 8/1993 | Garback | |
| 5,255,184 A | 10/1993 | Hornick et al. | |
| 5,270,921 A | 12/1993 | Hornick | |
| 5,289,401 A | 2/1994 | Shima | |
| 5,704,017 A | 12/1997 | Heckerman et al. | |
| 5,732,398 A | 3/1998 | Tagawa | |
| 5,794,207 A | 8/1998 | Walker et al. | |
| 5,797,127 A | 8/1998 | Walker et al. | |
| 5,832,452 A | 11/1998 | Schneider et al. | |
| 5,864,818 A | 1/1999 | Feldman | |
| 5,875,126 A | 2/1999 | Minch et al. | |
| 5,897,620 A | 4/1999 | Walker et al. | |
| 5,918,209 A | 6/1999 | Campbell et al. | |
| 5,933,039 A | 8/1999 | Hui et al. | |
| 6,041,308 A | 3/2000 | Walker et al. | |
| 6,076,070 A | 6/2000 | Stack | |
| 6,085,164 A | 7/2000 | Smith et al. | |
| 6,085,169 A | 7/2000 | Walker et al. | |
| 6,092,017 A | 7/2000 | Ishida et al. | |
| 6,108,639 A | 8/2000 | Walker et al. | |
| 6,112,185 A | 8/2000 | Walker et al. | |
| 6,134,534 A | 10/2000 | Walker et al. | |
| 6,167,383 A | 12/2000 | Henson | |
| 6,240,396 B1 | 5/2001 | Walker et al. | |
| 6,263,323 B1 | 7/2001 | Baggett | |
| 6,275,808 B1 | 8/2001 | DeMarcken | |
| 6,295,521 B1 | 9/2001 | DeMarcken et al. | |
| 6,307,572 B1 | 10/2001 | DeMarcken et al. | |
| 6,332,129 B1 | 12/2001 | Walker et al. | |
| 6,345,090 B1 | 2/2002 | Walker et al. | |
| 6,356,878 B1 | 3/2002 | Walker et al. | |
| 6,377,932 B1 | 4/2002 | DeMarcken | |
| 6,381,578 B1 | 4/2002 | DeMarcken | |
| 6,418,413 B2 | 7/2002 | DeMarcken et al. | |
| 6,418,415 B1 | 7/2002 | Walker et al. | |
| 6,442,526 B1 | 8/2002 | Vance et al. | |
| 6,484,153 B1 | 11/2002 | Walker et al. | |
| 6,510,418 B1 | 1/2003 | Case et al. | |
| 6,553,346 B1 | 4/2003 | Walker et al. | |
| 6,567,824 B2 | 5/2003 | Fox | |
| 6,609,098 B1 | 8/2003 | DeMarcken | |
| 6,658,422 B1 | 12/2003 | Levanoni et al. | |
| 6,974,079 B1 | 12/2005 | Strothmann et al. | |
| 6,990,457 B1 | 1/2006 | Litman et al. | |
| 7,010,494 B2 | 3/2006 | Etzioni et al. | |
| 7,076,451 B1 | 7/2006 | Coupland et al. | |
| 7,110,960 B2 | 9/2006 | Phillips et al. | |
| 7,133,848 B2 | 11/2006 | Phillips et al. | |
| 7,136,821 B1 | 11/2006 | Kohavi et al. | |
| 7,181,410 B1 | 2/2007 | Jones et al. | |
| 7,209,895 B2 | 4/2007 | Kundtz et al. | |
| 7,263,496 B1 | 8/2007 | Weigelt et al. | |
| 7,263,664 B1 | 8/2007 | Daughtrey | |
| 7,313,539 B1 | 12/2007 | Pappas et al. | |
| 7,333,959 B2 | 2/2008 | Kawamura et al. | |
| 7,346,520 B2 | 3/2008 | Etzioni et al. | |
| 7,394,900 B1 | 7/2008 | Gerber et al. | |
| 7,693,750 B2 | 4/2010 | Christensen | |
| 7,797,187 B2 | 9/2010 | Crean et al. | |
| 7,974,863 B2 | 7/2011 | Etzioni et al. | |
| 8,200,514 B1 | 6/2012 | Crean et al. | |
| 8,200,549 B1 | 6/2012 | Crean et al. | |
| 2001/0039519 A1 | 11/2001 | Richards | |
| 2002/0002548 A1 | 1/2002 | Roundtree | |
| 2002/0007331 A1 | 1/2002 | Lo et al. | |
| 2002/0032666 A1 | 3/2002 | Kawamura et al. | |
| 2002/0082877 A1 | 6/2002 | Schiff et al. | |
| 2002/0099636 A1* | 7/2002 | Narumo | 705/36 |
| 2002/0111935 A1 | 8/2002 | Jones et al. | |
| 2002/0116348 A1 | 8/2002 | Phillips et al. | |
| 2002/0120492 A1 | 8/2002 | Phillips et al. | |
| 2002/0152101 A1 | 10/2002 | Lawson et al. | |
| 2002/0152111 A1* | 10/2002 | Cox et al. | 705/10 |
| 2002/0156659 A1 | 10/2002 | Walker et al. | |
| 2002/0156661 A1 | 10/2002 | Jones et al. | |
| 2002/0161689 A1 | 10/2002 | Segal | |
| 2002/0169760 A1 | 11/2002 | Cheung et al. | |
| 2002/0178069 A1 | 11/2002 | Walker et al. | |
| 2002/0184059 A1 | 12/2002 | Offutt et al. | |
| 2003/0004760 A1 | 1/2003 | Schiff et al. | |
| 2003/0023500 A1* | 1/2003 | Boies et al. | 705/26 |
| 2003/0033164 A1 | 2/2003 | Faltings et al. | |
| 2003/0036928 A1 | 2/2003 | Kenigsberg et al. | |
| 2003/0040946 A1 | 2/2003 | Sprenger et al. | |
| 2003/0055779 A1 | 3/2003 | Wolf | |
| 2003/0061179 A1 | 3/2003 | Reece | |
| 2003/0061211 A1 | 3/2003 | Shultz et al. | |
| 2003/0069747 A1 | 4/2003 | Strothmann et al. | |
| 2003/0125994 A1 | 7/2003 | Jaehn et al. | |
| 2003/0130899 A1 | 7/2003 | Ferguson et al. | |
| 2003/0154142 A1* | 8/2003 | Ginsburg et al. | 705/28 |
| 2003/0182052 A1 | 9/2003 | DeLorme et al. | |
| 2003/0187705 A1 | 10/2003 | Schiff et al. | |
| 2003/0187771 A1 | 10/2003 | Bulan | |
| 2003/0187772 A1 | 10/2003 | Papka | |
| 2003/0225608 A1 | 12/2003 | Wu et al. | |
| 2003/0229552 A1 | 12/2003 | Lebaric et al. | |
| 2004/0054634 A1* | 3/2004 | Tak | 705/400 |
| 2004/0078252 A1 | 4/2004 | Daughtrey et al. | |
| 2004/0098287 A1 | 5/2004 | Young et al. | |
| 2004/0249683 A1 | 12/2004 | Demarcken et al. | |
| 2005/0004819 A1 | 1/2005 | Etzioni et al. | |
| 2005/0033616 A1 | 2/2005 | Vavul et al. | |
| 2005/0043974 A1 | 2/2005 | Vassilev et al. | |
| 2005/0044001 A1 | 2/2005 | Narayanaswami | |
| 2005/0086087 A1 | 4/2005 | Razza et al. | |
| 2005/0090911 A1 | 4/2005 | Ingargiola et al. | |
| 2005/0091146 A1 | 4/2005 | Levinson | |
| 2005/0108069 A1 | 5/2005 | Shiran et al. | |
| 2005/0154620 A1 | 7/2005 | Hentschel et al. | |
| 2005/0177402 A1 | 8/2005 | Walker et al. | |
| 2005/0197893 A1 | 9/2005 | Landau et al. | |
| 2005/0216301 A1 | 9/2005 | Brown | |
| 2005/0273373 A1 | 12/2005 | Walker et al. | |
| 2005/0283389 A1 | 12/2005 | Widjaja et al. | |
| 2006/0064333 A1 | 3/2006 | Razza et al. | |
| 2006/0106655 A1 | 5/2006 | Lettovsky et al. | |
| 2006/0116901 A1 | 6/2006 | Ookubo et al. | |
| 2006/0129463 A1 | 6/2006 | Zicherman | |
| 2006/0143159 A1 | 6/2006 | Chowdhury et al. | |
| 2006/0161480 A1 | 7/2006 | Christensen | |
| 2006/0173753 A1 | 8/2006 | Padmanabhan et al. | |
| 2006/0206395 A1* | 9/2006 | Vallabh | 705/26 |
| 2006/0235768 A1 | 10/2006 | Tatum et al. | |
| 2006/0247954 A1 | 11/2006 | Hunt | |
| 2007/0021991 A1 | 1/2007 | Etzioni et al. | |
| 2007/0038553 A1 | 2/2007 | Miller et al. | |
| 2007/0061174 A1 | 3/2007 | Phillips | |
| 2007/0073562 A1 | 3/2007 | Brice et al. | |
| 2007/0112635 A1 | 5/2007 | Loncaric | |
| 2007/0198306 A1 | 8/2007 | Crean et al. | |
| 2007/0198307 A1 | 8/2007 | Crean et al. | |
| 2007/0198308 A1 | 8/2007 | Crean et al. | |
| 2007/0198309 A1 | 8/2007 | Crean et al. | |
| 2007/0198310 A1 | 8/2007 | Crean et al. | |
| 2007/0226084 A1 | 9/2007 | Cowles | |
| 2008/0046298 A1 | 2/2008 | Ben-Yehuda et al. | |
| 2008/0091726 A1 | 4/2008 | Koretz et al. | |
| 2008/0103842 A1 | 5/2008 | Johnson | |
| 2008/0114622 A1 | 5/2008 | Crean et al. | |
| 2008/0208663 A1 | 8/2008 | Walker et al. | |
| 2008/0228658 A1 | 9/2008 | Crean et al. | |
| 2009/0030746 A1 | 1/2009 | Etzioni et al. | |
| 2009/0063167 A1 | 3/2009 | Bartot et al. | |
| 2010/0250291 A1 | 9/2010 | Walker et al. | |
| 2011/0046989 A1 | 2/2011 | Crean et al. | |
| 2011/0131109 A1 | 6/2011 | Pappas et al. | |

FOREIGN PATENT DOCUMENTS

| | | |
|---|---|---|
| JP | 5335656 A | 12/1993 |
| JP | 2000076335 A | 3/2000 |
| JP | 2002024550 | 1/2002 |

(56) References Cited

FOREIGN PATENT DOCUMENTS

| | | |
|---|---|---|
| JP | 2002092249 A | 3/2002 |
| JP | 2002259779 A | 9/2002 |
| JP | 2002358472 A | 12/2002 |
| JP | 2003006293 A | 1/2003 |
| JP | 2005275487 A | 10/2005 |
| WO | WO-0057331 A2 | 9/2000 |
| WO | WO-03052550 A2 | 6/2003 |
| WO | WO-03081385 A2 | 10/2003 |
| WO | WO2007143577 | 12/2007 |

OTHER PUBLICATIONS

Credeur, Mary J., "Worldspan Introduces FareAware, Powerful New Low-Fare Search Solution for the Online Travel Market" Feb. 17, 2003, PR Newswire, Atlanta, 2 pages.*
U.S. Appl. No. 12/253,195, filed Oct. 16, 2008, Crean et al.
Bly, L., "Comparison-Shopping Tools Lure Travelers," USA Today, Oct. 17, 2003 (3 pages).
"NexTag Launches ServicesShopping (SM) With Comparison Shopping for Mortgages, Travel Cars, Real Estate and Education," PR Newswire, Oct. 25, 2004 (2 pages).
TravelCLICK, Hotelligence Report, Feb. 2, 2004 (14 pages).
Tedeschi, B., "Orbitz Offers Options for Flexible Travelers," May 11, 2003 (2 pages).
PCT International Search Report, US06/02136, Applicant: Search Party, Inc., Mailing Date: Aug. 17, 2007, (2 pages).
PCT International Search Report, US2008/074680, Applicant: Farecast, Inc., Mailing Date: Mar. 19, 2009, (3 pages).
PCT International Search Report, US08/56901, Applicant: Farecast, Inc., Mailing Date: Jun. 25, 2008, (3 pages).
PCT International Search Report, US07/62332, Applicant: Farecast Inc., Mailing Date: Sep. 25, 2007, (2 pages).
PCT International Search Report, US04/09498, Applicant: University of Washington, Mailing Date: Aug. 2, 2005, (2 pages).
PCT International Search Report, US07/83882, Applicant: Farecast, Inc., Mailing Date: May 7, 2008, (2 pages).
Castleworks, Inc., "Daily Schedule," Feb. 5, 2004, (2 pages).
SeatGuru, Domestic Economy Comparison Chart, Sep. 1, 2006, 8 pages
Richtel, M., "Man Emerges, Still Breathing, After E-Cave Confinement," New York Times, Final Edition, p. 33, col. 1, Sep. 22, 1999, 5 pages.
Anon., "Women Outpace Men in Cell Phone Ownership, but Men Are More Fanatic About PDAs," Business Wire, Mar. 1, 2001, 2 pages.
Belobaba, Peter P., "Application of a Probabilistic Decision Model to Airline Seat Inventory Control," Mar.-Apr. 1989; Operations Research, pp. 183-197.
Chmielewski, Dawn C., "San Francisco-Based Firm Develops Technology for Interactive TV," Apr. 19, 2001, KRTBN Knight Ridder Tribune Business News (San Jose Mercury News, California), 2 pages.
Cohen, William W., "Fast Effective Rule Induction," Proceedings of the 12th International Conference on Machine Learning 1995, 10 pages.
Davis et al., "BLUR—the speed of change in the connected economy," Sep./Oct. 2002, British Journal of Administrative Management, n22, pp. 20.
Etzioni, Oren, et al., "To Buy or Not to Buy: Mining Airfare Data to Minimize Ticket Purchase Price," Proceedings of the Ninth ACM SIGKDD 2003, Aug. 24-27, 2003, Washington, D.C., 10 pages.
Grossman, David, "Getting a good airplane seat," http://www.usatoday.com/travel/columnist/grossman/2006-11-03-grossman_x.htm, Nov. 3, 2006, USATODAY.com, 2 pages.
Harrill, Rob, "Airline analyzer could save big bucks by advising when to buy tickets," University of Washington; Apr. 1, 2003, http://www.washington.edu/newsroom/news/2003archive/04-03archive/k040103.html., 3 pages.
Ioannidis, Yannis, "The History of Histograms (abridged)," Proceedings of the 29th VLDB Conference, Berlin, Germany, 2003, 12 pages.
ITA Software, "Corporate Background," accessed Feb. 9, 2004, 1 page.
Merriam Webster, "criteria," http://www.merriam-webster.com/dictionary/criteria, Sep. 22, 2010, 2 pages.
Muehlbauer, Jen, "Orbitz Reaches New Heights, Better technology results in a competitive advantage," CMP Media LLC, Apr. 2002, pp. 1-5.
rivalwatch.com 1999-2003, 13 pages.
Robinson, Sara, "Computer Scientists Find Unexpected Depths in Airfare Search Problem," Society for Industrial and Applied Mathematics, Jul./Aug. 2002, pp. 1-6.
SeatGuru, Finding Your Aircraft Type, http://web.archive.org/web/20060316200628/http://seatguru.com/articles/aircraft_type.php, Mar. 16, 2006, 5 pages.
Sutton, Richard S., et al., "Reinforcement Learning: An Introduction," MIT Press, Cambridge, MA, 1998, http://www-anw.cs.umass.edu/~rich/book/the-book.html, accessed May 5, 2004, pp. 1-3.
Ting, Kai Ming et al., "Issues in Stacked Generalization," Journal of Artificial Intelligence Research 10 (1999), pp. 271-289.
"Farecast.com Launches Public Beta; Becomes First to Provide Airfair Predictions," PR Newswire, published Jun. 27, 2006, pp. 2-3 of 3 pgs.
Credeur, Mary J., "Worldspan Bringing 'Transparency' to Airline Ticket Prices," Atlanta Business Chronicle, Feb. 17, 2003.
"Worldspan Introduces FareAware, Powerful New Low-Fare Search Solution for the Online Travel Market," PRNewswire, Feb. 17, 2003, http://www.thefreelibrary.com/_/print/PrintArticle.aspx?id=97719443, retrieved Nov. 9, 2012.

* cited by examiner

Example Historical Pricing Information Database

| Flight | Offer Price | Offer Time | Offer Class | Departure Date | Departure Time | Departure Location | Destination Location | Remaining Available Seats |
|---|---|---|---|---|---|---|---|---|
| AA192 | $350 | 12/15/XX 03:13pm | Y | 01/07/XX | 12:15pm | LAX | BOS | - |
| UA218 | $600 | 12/15/XX 03:14pm | Y | 01/07/XX | 11:30am | LAX | BOS | - |
| AA192 | $200 | 12/15/XX 03:14pm | Y | 01/08/XX | 12:15pm | LAX | BOS | - |
| AA563 | $275 | 12/15/XX 03:15pm | Y | 01/07/XX | 10:15pm | LAX | BOS | - |
| AA192 | $725 | 12/17/XX 10:15am | Y | 01/07/XX | 12:15pm | LAX | BOS | - |
| AA192 | $325 | 12/19/XX 02:38pm | Y | 01/07/XX | 12:15pm | LAX | BOS | - |

*FIG. 1A*

Seattle, WA (SEA) to Boston, MA (BOS) ⟵ 159

1 Choose a departing flight

Sort by: ⦿ Price  ○ Shortest flights  ○ Departure time

Note: The prices shown below are e-ticket prices and include all taxes and fees. ⟵ 156
Hamlet Special Fare: Restrictions and limitations apply. Please review carefully. ⟵ 155

from $499 Roundtrip                                    Hamlet Special Fare
8:50 am Depart Seattle (SEA)    Wed 11-Feb      Alaska Airlines 12
Arrive Boston (BOS) 5:02 pm     Duration: 5hr    Nonstop flight
                                12mn
                                                 ➔ Choose this departure    150a

157

from $598 Roundtrip
8:07 am Depart Seattle (SEA)    Wed 11-Feb      United Airlines
Arrive Boston (BOS) 6:15 pm     Duration: 7hr    1232/1216
                                8mn              Connect in Denver
                                                 ➔ Choose this departure    150b

150

from $649 Roundtrip
8:50 am Depart Seattle (SEA)    Wed 11-Feb      Alaska Airlines 12
Arrive Boston (BOS) 5:02 pm     Duration: 5hr    Nonstop flight
                                12mn
                                                 ➔ Choose this departure    150c

from $678 Roundtrip
1:45 pm Depart Seattle (SEA)    Wed 11-Feb      American Airlines
Arrive Boston (BOS) 9:50 pm     Duration: 5hr    230
                                5mn              Nonstop flight
                                                 ➔ Choose this departure    150d Change Search

*FIG. 1J*

Seattle, WA (SEA) to Boston, MA (BOS)

169

Your selected departure  Choose a different departure

| 8:50 am Depart Seattle (SEA) | Wed 11-Feb | Alaska Airlines 12 |
| Arrive Boston (BOS) 5:02 pm | Duration: 5hr 12mn | Nonstop flight |

162

2 Choose a return flight

Note: The prices shown below are e-ticket prices and include all taxes and fees.

Hamlet Special Fare: Restrictions and limitations apply.  Please review carefully.  165

---

$499 Roundtrip　　　　　　　　　　　　　　　Hamlet Special Fare

| 9:45 am Depart Boston (BOS) | Mon 16-Feb | Alaska Airlines |
| Arrive Seattle (SEA) 12:54 pm | Duration: 6hr 21mn | 1551 Nonstop flight |

→ Choose this return    160a

160

$499 Roundtrip　　　　　　　　　　　　　　　Hamlet Special Fare

| 5:49 pm Depart Boston (BOS) | Mon 16-Feb | Alaska Airlines 15 |
| Arrive Seattle (SEA) 9:10 pm | Duration: 6hr 21mn | Nonstop flight |

→ Choose this return    160b

Change Search

*FIG. 1K*

Seattle, WA (SEA) to Boston, MA (BOS)      ⌐ 179

Your selected departure   Choose a different departure                    ⌐ 172
| 8:07 am Depart Seattle (SEA) | Wed 11-Feb |  | United Airlines 1232/1216 |
| Arrive Boston (BOS) 6:15 pm | Duration: 7hr 8mn | | Connect in Denver |

2 Choose a return flight

Sort by:  ⊙ Price   ○ Shortest flights   ○ Departure time

Note: The prices shown below are e-ticket prices and include all taxes and fees.

Hamlet Fare Index: 3  means this fare is unlikely to fall but may rise.  } 178

⌐ 177

Hamlet Special Fare of $499 available.  See flight options.
Restrictions and limitations apply. Please review carefully.
                                                                            175

 $598 Roundtrip 3                          Good Fare, Buy Now!

10:05 am Depart Boston (BOS)    Mon 16-Feb         United Airlines 221
Arrive Seattle (SEA) 3:33 pm    Duration: 8hr                  1 stop
                                28mn Buy Price Protection for $10,
and if the price drops after    ⎫ 176
purchase, require the lower
price! See details.                                            ⊖ Choose this return
                                                                                        170a

 $649 Roundtrip

9:45 am Depart Boston (BOS)     Mon 16-Feb         Alaska Airlines
Arrive Seattle (SEA) 12:54 pm   Duration: 6hr                  1551
                                21mn                           Nonstop flight
                                                               ⊖ Choose this return
                                                                                        170b

170 {

 $678 Roundtrip

1:26 pm Depart Boston (BOS)     Mon 16-Feb         American Airlines
Arrive Seattle (SEA) 7:15 pm    Duration: 8hr   AA             1103/1301
                                49mn                           Connect in Chicago
                                                               ⊖ Choose this return     170c Change Search

*FIG. 1L*

Seattle, WA (SEA) to Boston, MA (BOS) ⎯189a

Your selected departure   Choose a different departure ⎯182

| 1:45 pm Depart Seattle (SEA) | Wed 11-Feb | AA | American Airlines 230 |
| Arrive Boston (BOS) 9:50 pm | Duration: 5hr 5mn | | Nonstop flight |

2 Choose a return flight

Sort by:  ⦿Price   ◯Shortest flights   ◯Departure time

Note: The prices shown below are e-ticket prices and include all taxes and fees.

Hamlet Fare Index: Register now and Hamlet will tell you whether these fares are low or likely to rise in the days ahead. ⎯183

Hamlet Special Fare of $499 available. See flight options.
Restrictions and limitations apply. Please review carefully.

---

$598 Roundtrip                                              Is this a good fare? ⎯181a
                                                                 Register now to find out

| 10:05 am Depart Boston (BOS) | Mon 16-Feb |  | United Airlines 221 |
| Arrive Seattle (SEA) 3:33 pm | Duration: 8hr 28mn | | 1 stop |

↪ Choose this return ⎯180a

---

$649 Roundtrip                                              Is this a good fare? ⎯181b
                                                                 Register now to find out

| 9:45 am Depart Boston (BOS) | Mon 16-Feb |  | Alaska Airlines |
| Arrive Seattle (SEA) 12:54 pm | Duration: 6hr 21mn | | 1551 |
| | | | Nonstop flight |

↪ Choose this return ⎯180b

---

$678 Roundtrip                                              Is this a good fare? ⎯181c
                                                                 Register now to find out

| 1:26 pm Depart Boston (BOS) | Mon 16-Feb |  | American Airlines |
| Arrive Seattle (SEA) 7:15 pm | Duration: 8hr 49mn | | 1103/1301 |
| | | | Connect in Chicago |

↪ Choose this return ⎯180c

Change Search

*FIG. 1M*

Seattle, WA (SEA) to Boston, MA (BOS)

Your selected departure   Choose a different departure

| 9:07 am Depart Seattle (SEA) | Wed 11-Feb | | United Airlines 1232/1216 |
| Arrive Boston (BOS) 6:15 pm | Duration: 7hr 8mn | | Connect in Denver |

2 Choose a return flight

Sort by:  ⦿Price   ⚪Shortest flights   ⚪Departure time

Note: The prices shown below are e-ticket prices and include all taxes and fees.

Hamlet Fare Index: ⬆ means this fare is unlikely to fall but may rise.

Hamlet Special ⬆ Fare of $499 available.  See flight options.
Restrictions and limitations apply.  Please review carefully.

---

✈ $598 Roundtrip ⬆          Buy Now – Price Not Likely to Drop and May Sellout Soon!          ⟩ 184a

| 10:05 am Depart Boston (BOS) | Mon 16-Feb | | United Airlines 221 |
| Arrive Seattle (SEA) 3:33 pm | Duration: 8hr 28mn | | 1 stop |

↪ Choose this return

---

✈ $649 Roundtrip ?          Hold Off – Price Likely to Drop!          ⟩ 184b

| 9:45 am Depart Boston (BOS) | Mon 16-Feb | | Alaska Airlines |
| Arrive Seattle (SEA) 12:54 pm | Duration: 6hr 21mn | | 1551 |
| | | | Nonstop flight |

↪ Choose this return

---

✈ $678 Roundtrip ?          Price Unlikely to Change Much During Next 7 Days          ⟩ 184c

| 1:26 pm Depart Boston (BOS) | Mon 16-Feb | | American Airlines |
| Arrive Seattle (SEA) 7:15 pm | Duration: 8hr 49mn | | 1103/1301 |
| | | | Connect in Chicago |

↪ Choose this return

Change Search

*FIG. 1N*

Seattle, WA (SEA) to Boston, MA (BOS)

1 Choose a departing flight  ⎯ 199

Sort by: ⊙ Price  ○ Shortest flights  ○ Departure time

Note: The prices shown below are e-ticket prices and include all taxes and fees.
Name Your Price: Restrictions and limitations apply. <u>Please review carefully</u>.

⎯ 193

| 8:50 am Depart Seattle (SEA) | Wed 11-Feb |  | Alaska Airlines 12 |
| Arrive Boston (BOS) 5:02 pm | Duration: 5hr 12mn | | Nonstop flight |
| | | | ↪ Choose this departure |

| 8:07 am Depart Seattle (SEA) | Wed 11-Feb |  | United Airlines |
| Arrive Boston (BOS) 6:15 pm | Duration: 7hr 8mn | | 1232/1216 |
| | | | Connect in Denver |
| | | | ↪ Choose this departure |

<u>Change Search</u>

FIG. 10

PERFORMING PREDICTIVE PRICING BASED ON HISTORICAL DATA

CROSS-REFERENCE TO RELATED APPLICATION(S)

This application is a continuation of U.S. application Ser. No. 11/352,420 filed Feb. 10, 2006, which is a continuation of U.S. application Ser. No. 10/811,077 filed Mar. 26, 2004 (now U.S. Pat. No. 7,010,494), which claims the benefit of provisional U.S. Patent Application No. 60/458,321, filed Mar. 27, 2003 and entitled "Mining Historical Pricing Data To Provide Guidance For Current Purchases," which applications are hereby incorporated by reference in their entirety.

STATEMENT REGARDING FEDERALLY SPONSORED RESEARCH

The University of Washington and the University of Southern California have granted a royalty-free non-exclusive license to the U.S. government pursuant to 35 U.S.C. Section 202(c)(4) for any patent claiming an invention subject to 35 U.S.C. Section 201.

TECHNICAL FIELD

The following disclosure relates generally to the use of techniques for predicting future pricing information for items based on analysis of prior pricing information for the items, and more particularly to using such predicted future pricing information in a variety of ways, such as to assist users in making better buying and/or selling decisions.

BACKGROUND

In many situations, potential buyers or other acquirers of various types of items (such as products and/or services) are faced with difficult decisions when attempting to determine whether acquiring a particular item of interest under current conditions is desirable or optimal based on their goals, or whether instead delaying the acquisition would be preferable. For example, when the potential acquirer desires to obtain the item at the lowest price possible before some future date, and the item is currently offered by a seller for a current price, the potential acquirer needs to evaluate whether accepting the current price is more advantageous than the potential benefits and costs associated with waiting to see if the item will continue to be available and will be later offered at a lower price before the future date. Such potential acquisitions can include a variety of types of transactions (e.g., fixed-price purchase, auction-based purchase, reverse auction purchase, name-your-price purchase, rent, lease, license, trade, evaluation, sampling, etc.), and can be performed in a variety of ways (e.g., by online shopping using a computing device, such as via the World Wide Web or other computer network).

The difficulty of evaluating a potential current item acquisition is exacerbated in environments in which the prices of the items frequently change, such as when sellers or other suppliers of the items frequently modify item prices (e.g., in an attempt to perform yield management and maximize overall profits). In such environments, the likelihood of future price changes may be high or even a certainty, but it may be difficult or impossible for the potential acquirer to determine whether the future price changes are likely to be increases or drops, let alone a likely magnitude and timing of such changes. A large number of types of items may have such frequent price changes, such as airline tickets, car rentals, hotel rentals, gasoline, food products, jewelry, various types of services, etc. Moreover, a potential acquirer may in some situations need to evaluate not only a current price of an item of interest from a single seller or other provider, but may future need to consider prices offered by other providers and/or prices for other items that are sufficiently similar to be potential substitutes for the item of interest (e.g., airline flights with the same route that leave within a determined period of time, whether from the same airline or from competitor airlines).

In a similar manner, some sellers or other providers of items may similarly face difficulties in determining an advantageous strategy related to the providing of the items, such as for intermediary sellers that must acquire an item from a third-party supplier (e.g., an original supplier of the item or other intermediary seller) before providing it to a customer. For example, it may be difficult in at least some situations for such intermediary sellers to know what price to offer to customers in order to maximize profit, as well as whether to immediately acquire from a third-party supplier an item purchased by a customer or to instead delay such an acquisition in an attempt to later acquire the item at a lower price. In the context of the airline industry, for example, such intermediary sellers may include various types of travel agents, including travel agents that typically buy only single airline tickets in response to explicit current instructions from a customer, consolidators that buy large numbers of airline tickets in advance for later resale, tour package operators that buy large numbers of airline tickets for bundling with other tickets and/or services, etc.

Thus, it would be beneficial to be able to predict future pricing information for items, such as likely future directions in price changes and/or likely specific future item prices, as doing so would enable buyers and/or intermediate sellers to make better acquisition-related decisions.

DETAILED DESCRIPTION

Figure 1B:
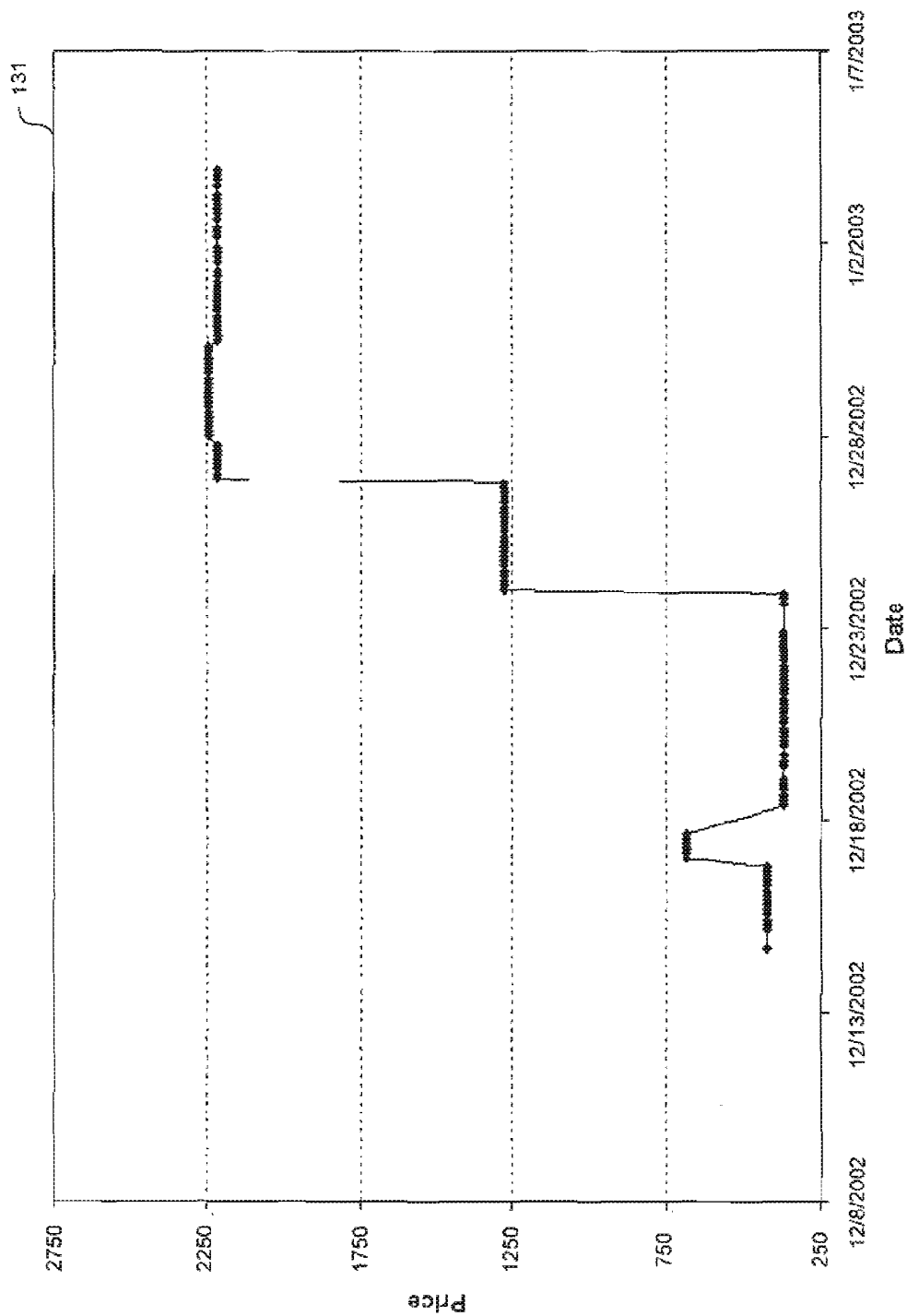
FIGS. 1A-1O provide examples illustrating the use of predictive pricing techniques in a variety of situations.

A software facility is described below that uses predictive pricing information for items in order to assist in evaluating decisions related to the items in various ways, such as to assist end-user item acquirers in evaluating purchasing decisions related to the items and/or to assist intermediate providers of the items in evaluating selling decisions related to the items.

In some embodiments, the predictive pricing techniques are used for items whose prices are dynamically changed by suppliers of the items to reflect various factors and goals, such as to use yield management and differential pricing techniques in an attempt to maximize profits—moreover, in some such embodiments the factors and/or any underlying pricing algorithms that are used by the item suppliers may further be unknown when performing the predictive pricing activities. Furthermore, in some embodiments the predictive pricing techniques may be applied to items that are "perishable" so as to have an expiration or other use date after which the item has a different value (e.g., a lower value, including no value), such as performances/events/occurrences and/or services that occur on or near the expiration or use date, or information whose value is based at least in part on its timeliness or recency—in such embodiments, a supplier of such an item may alter prices or other conditions for the item as its expiration or use date approaches, such as to discount a price for the item or alternatively to raise such a price. Any such actions by suppliers based on expiration or use dates for items may in some embodiments be performed by the suppliers in a purely formulaic and repeatable manner (e.g., as an automated process), while in other embodiments some subjective variability may be included with respect to such actions (e.g., based on manual input for or oversight of the actions). When discussed herein, a supplier of an item includes an original supplier of an item and/or any other party involved in providing of the item who has control over or influence on the setting of a current price for the item before it becomes available to an acquirer (whether an intermediate seller or an end-user customer), and may further in some situations include multiple such parties (e.g., multiple parties in a supply chain).

In particular, in some embodiments the predictive pricing for an item is based on an analysis of historical pricing information for that item and/or related items. Such historical pricing information analysis may in some embodiments automatically identify patterns in the prices, such as patterns of price increases or drops. In addition, in some such embodiments the analysis further associates the prices and/or patterns with one or more related factors (e.g., factors that have a causal effect on the prices or are otherwise correlated with the prices), such as factors that are automatically identified in one or more of a variety of ways during the analysis. Furthermore, in some embodiments predictive pricing policies are also automatically developed based on other automatically identified predictive pricing information, such as to enable specific price-related predictions for a particular item given specific current factors. In addition, in some embodiments the historical pricing information may reflect prices for items that were previously offered by item suppliers to others, while in other embodiments the historical pricing information may reflect prices at which the items were actually previously acquired/provided. Specific mechanisms for performing such predictive pricing analysis are discussed in greater detail below.

When such predictive pricing information is available for an item, that information can then be used to assist acquirers (e.g., buyers) and/or intermediate providers (e.g., sellers) of an item in making better decisions related to acquiring and/or providing of the item. In particular, given information about current factors that are associated with the pricing information for the item, the predictive pricing information for the item can be used to make predictions about future pricing information for the item. Such future predicted pricing information can take various forms in various embodiments, including a likely direction of any future price changes, a likely timing of when any future price changes will occur, a likely magnitude of any future price changes, likely particular future prices, etc. In addition, in some embodiments the future predicted pricing information may further include predictions of the specific likelihood of one or more of such types of future pricing information. Moreover, in some embodiments and/or situations the predictive pricing information and/or assistance/functionality provided based on that information may be performed for a fee.

As one example, the facility may in some embodiments use predictive pricing information for items to advise potential buyers of those items in various ways. For example, when providing pricing information for an item to a current customer, a notification may in some embodiments be automatically provided to the customer to advise the customer in a manner based on predicted future pricing information for the item, such as whether the current price is generally a "good buy" price given those predicted future prices, or more specifically whether to buy immediately due to predicted future price increases or to delay buying due to predicted future price drops. Such advice could further in some embodiments provide specific reasons for the provided advice, such as based on information about specific predicted future pricing information (e.g., a specific predicted direction, time and/or magnitude of a future price change, a specific predicted future price, etc.), as well as additional details related to the advice (e.g., specific future conditions under which to make an acquisition, such as a specific amount of delay to wait and/or a specific future price to wait for). In situations in which the potential buyer does not need to immediately obtain the item and the predicted future pricing information indicates that the price is likely to drop, for example, the potential buyer can use that information to determine to delay a purchase.

In other situations, advice may be automatically provided to a user in other ways, such as by proactively alerting a potential buyer regarding a current and/or predicted future price for an item (e.g., an item in which the customer has previously expressed an interest), such as when a current price for the item reflects a good buy for the customer. In addition, in some embodiments the facility may further act as an agent on behalf of a customer in order to automatically acquire an item for the customer, such as based on prior general instructions from the customer related to purchasing an item or type of item when it is a good buy. Thus, in some embodiments such advice may be provided to users as part of an interactive response to a request, while in other situations the providing of the advice may instead be automatically initiated. In addition, in some embodiments and/or situations the providing of such advice and/or related functionality to a potential buyer or other acquirer may be performed for a fee, such as a fee charged to that acquirer.

In other embodiments, the facility may act on behalf of an intermediate seller of the item in order to provide advice to the seller. For example, in some situations in which a predicted future price for an item is lower than a current price, the intermediate seller may determine based on such advice to offer a price to a customer that is lower than the current price available to the intermediate seller (e.g., but above the lower predicted future price)—if so, and if the customer indicates to purchase the item, the intermediate seller may further delay purchasing the item from its supplier in order to attempt to acquire the item at a lower future price. More generally, when a predicted future price for an item is lower than a current price being offered to an intermediate seller, that knowledge about the lower predicted price may enable the intermediate seller to currently use the potential cost savings based on acquisitions at the later lower price in a variety of ways, including by passing some or all of the price difference on to customers, by retaining some or all of the price difference as profit, and/or by sharing some or all of the price difference with the supplier of the item to the intermediate seller (e.g., in exchange for the supplier immediately lowering their price to the intermediate seller).

In addition, in situations in which the future price is predicted not to drop, the intermediate seller may choose based on such advice to offer price protection to a customer (e.g., for a fee to the customer) based on that prediction, such as to provide additional benefit to the customer if the future actual price were to drop below the current price or some other specified price (e.g., a refund of the difference). In other embodiments, the facility may assist the intermediate seller to offer items to customers using a variety of other sales models, such as to allow customers to name a price at which the customer will purchase an item of interest (whether identified as a particular item or a category of items that is specified at any of a variety of levels of details) and to then assist the intermediate seller in determining whether to accept such an offer based on a comparison of the named price to a predicted future price for the item. In addition, in some embodiments and/or situations the providing of such advice and/or related functionality to intermediate sellers and other providers may be performed for a fee, such as a fee charged to that provider.

In addition, the facility may in some embodiments further assist buyers that purchase items in bulk (e.g., by aggregating numerous individual purchases into one), such as customers that themselves buy large numbers of the items (e.g., large corporations) and/or intermediate sellers (e.g., item consolidators) that are purchasing items from other suppliers. In such situations, the bulk purchaser may take a variety of types of steps to accomplish desired goals of the purchaser, such as to hedge or otherwise limit exposure to loss based on predicted future prices (e.g., by purchasing some but not all of multiple items at a current price even when the predicted future price is lower in order to minimize the risk of the actual future prices being higher than the current price). Alternatively, the bulk purchaser may be able to use information about predicted future prices to manually negotiate better current prices with a seller. In other embodiments, information about such predicted future prices can assist other types of users, including suppliers of items when they have such information about similar items offered by competitors, such as to provide first mover advantage for price decreases that are likely to occur in the future by the competitors. The information provided by the analysis may further assist in some embodiments in more generally identifying and predicting trends in prices over time for specific items and/or groups of related items, such as to enable a user to immediately take action in such a manner as to benefit from such trends. In addition, in some embodiments and/or situations the providing of such advice and/or related functionality to bulk purchasers may be performed for a fee, such as a fee charged to that bulk purchaser.

In some embodiments, the facility further assists users in analyzing historical purchase data, such as for bulk purchasers. For example, a large corporation may want to analyze their prior item purchases over a specified period of time in order to determine whether the purchase prices for the items were advantageous and/or optimal in light of later available prices for those items. In some situations, the actual prior purchase prices for items could be compared against alternative prior purchase prices for those items that would have been obtained based on following predictive pricing information for those items that would have been provided at the time of actual purchase (e.g., for advice related to delaying a purchase, determining a difference between the actual prior purchase price and a later actually available price at which the item would likely have been acquired based on the advice). This allows a determination to be made of the benefits that would have been obtained by using predictive pricing in those situations. In addition, in some embodiments the actual prior purchase prices could further be compared to optimal purchase prices for those items within a relevant time period before the item was needed, such as to see the differential (if any) between the actual purchase price and the lowest possible purchase price given perfect hindsight knowledge. In addition, in some embodiments and/or situations the providing of such advice and/or related functionality for analyzing historical purchase data may be performed for a fee, such as a fee charged to a customer to whom the historical purchase data corresponds.

Moreover, such analysis of prior purchase decisions provides information not only about the benefits of using the predictive pricing techniques, but also to assist in further refining the predictive pricing techniques (e.g., in an automated manner, such as based on a learning mechanism), such as based on identifying situations in which the predictive pricing techniques did not provide the best prediction available.

In addition, in various embodiments the predictive pricing information and/or related functionality is used to generate revenue and/or produce savings in a variety of ways, including through service fees, license fees, by maximizing profit for sellers and/or savings for acquirers, through related advertising, etc. Such revenue can be based on any or all of the various example types of functionality discussed above and in greater detail below.

For illustrative purposes, some embodiments of the software facility are described below in which particular predictive pricing techniques are used for particular types of items, and in which available predictive pricing information is used to assist buyers and/or sellers in various ways. However, those skilled in the art will appreciate that the techniques of the invention can be used in a wide variety of other situations, and that the invention is not limited to the illustrated types of items or predictive pricing techniques or uses of predictive pricing information. For example, some such items with which the illustrated predictive pricing techniques and/or uses of predictive pricing information include car rentals, hotel rentals, vacation packages, vacation rentals (e.g., homes, condominiums, timeshares, etc.), cruises, transportation (e.g., train, boat, etc.), gasoline, food products, jewelry, consumer electronics (e.g., digital and non-digital still and video cameras, cell phones, music players and recorders, video players and recorders, video game players, PDAs and other computing systems/devices, etc.), books, CDs, DVDs, video tapes, software, apparel, toys, electronic and board games, automobiles, furniture, tickets for movies and other types of performances, various other types of services, etc. Furthermore, the disclosed techniques could further be used with respect to item-related information other than prices, whether instead of or in addition to price information.

FIGS. 1A-1O provide examples illustrating the use of predictive pricing techniques in a variety of situations. In these examples, the predictive pricing techniques are applied to airline ticket information and are used by a provider of information about airline ticket prices, such as an intermediate seller travel agency. However, such techniques can also be used for other types of items and in other manners, as discussed elsewhere.

In particular, FIG. 1A illustrates a table 100 that provides examples of historical pricing information that may be gathered for airline flights and then analyzed to produce various types of predictive pricing information. In this example, the table includes entries 111-116 that each correspond to a different instance of actual price information for a particular flight, such as a ticket price offered for a flight at a particular time. The table also includes columns 102-104 that store information about the specific offer instance for the flight number indicated in column 101 and the departure date indicated in column 105. In addition, in the illustrated embodiment the table further includes columns 106-108 with additional information about the flight, although in other embodiments such information may be stored separately. Moreover, in some embodiments the table could store additional information about other factors that may have an effect on price changes, such as one or more sea-out factors related to whether/when a flight may sell out (e.g., based in part on a number of remaining available seats in column 109, although in the illustrated embodiment that information is not currently available).

While the flight prices reflect one-way tickets for specific flights of specific airlines in this example, related information could similarly be gathered and/or aggregated in various other ways, whether instead of or in addition to one-way tickets, including for round-trip and/or multi-segment tickets, and so as to enable predictive pricing for flights on a particular route between a departure airport and an arrival airport, for flights on one or more routes between a particular pair of cities or regions (e.g., when the departure and/or arrival cities/regions include multiple airports), for flights into and/or out of an airport hub for one or more airlines, for flights on a route with an associated time (e.g., a specified departure time or departure time range, a specified arrival time or arrival time range, a specified interval of time for the travel, etc.), for some or all flights from a particular airline, for some or all flights into or out of an airport and/or city/region, for some or all flights that depart and/or arrive at a specified airport/city/region within a specified time frame, etc.

FIG. 1B illustrates a chart 131 that provides an example of historical offer price information over time for a particular airline flight, such as a flight that departs in this example on January 7, and is represented with a particular flight number from a particular airline (not shown). As one example, the illustrated price information may correspond to a group of historical information that includes entries 111 and 115-116 of table 100 in FIG. 1A. In other embodiments, information could instead be analyzed for airline flights in other ways, such as by aggregating information for a particular airline route over multiple days and/or by aggregating information for multiple airline flights of a particular airline or that are otherwise similar. In this example, the price data generally shows three tiers of relatively stable prices, although there is an additional small price fluctuation in the first price tier around the dates of December 17 and December 18 (e.g., based on a reaction of the airline to a temporary price increase by a competitor on a flight for the same route and date).

Figure 1C:
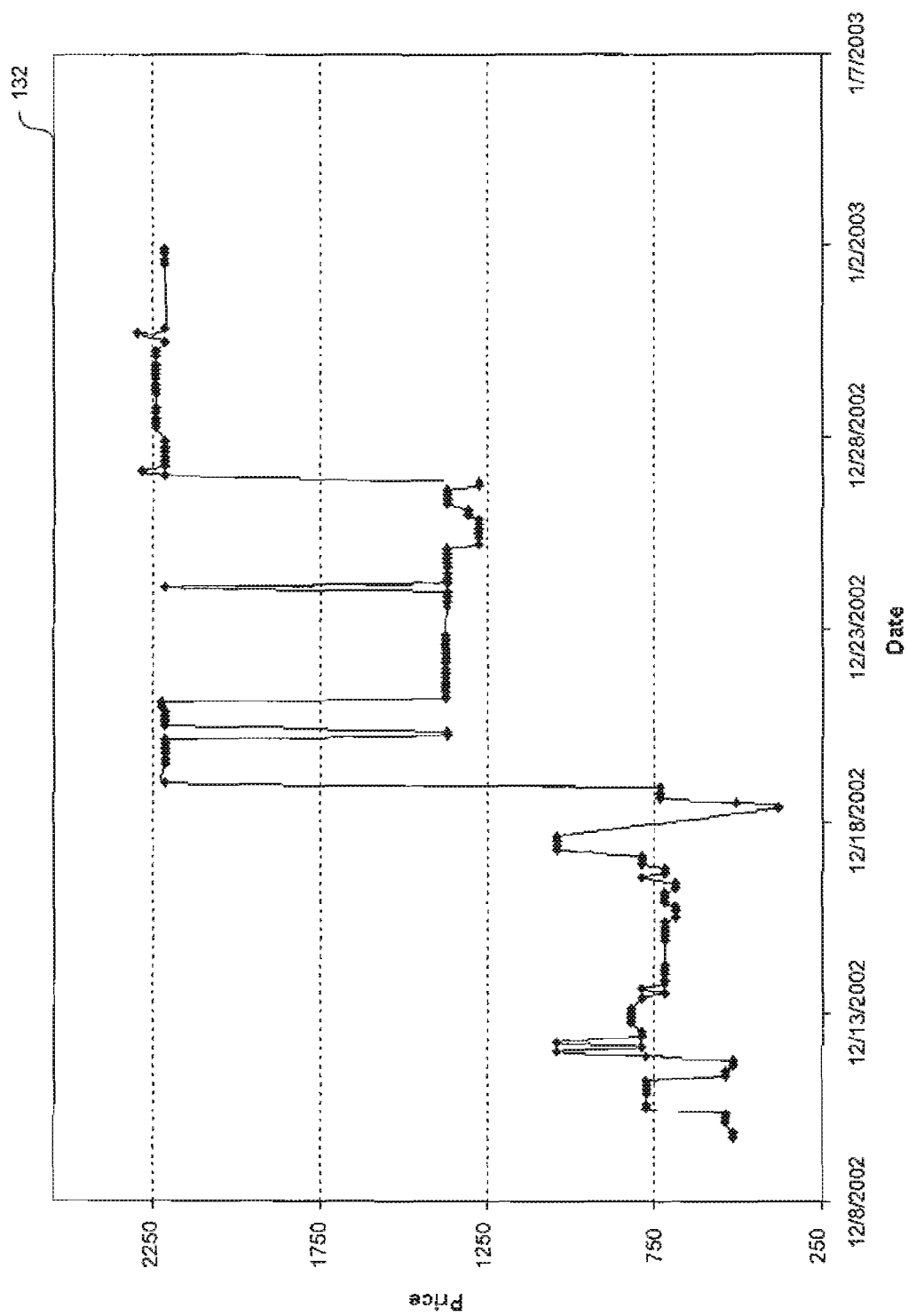

FIG. 1C illustrates a chart 132 that provides an example of historical price information for the same flight except with a different departure date that is five days earlier, which in this example results in a departure date of January 2 rather than January 7. Despite the similarities between the two flights (the same airline, flight number, route and close departure date), the price of this airline flight with the earlier departure date fluctuates much more than that of the flight discussed with respect to FIG. 1B, such as based at least in part on the increased demand for travel near the New Year holiday.

Figure 1D:
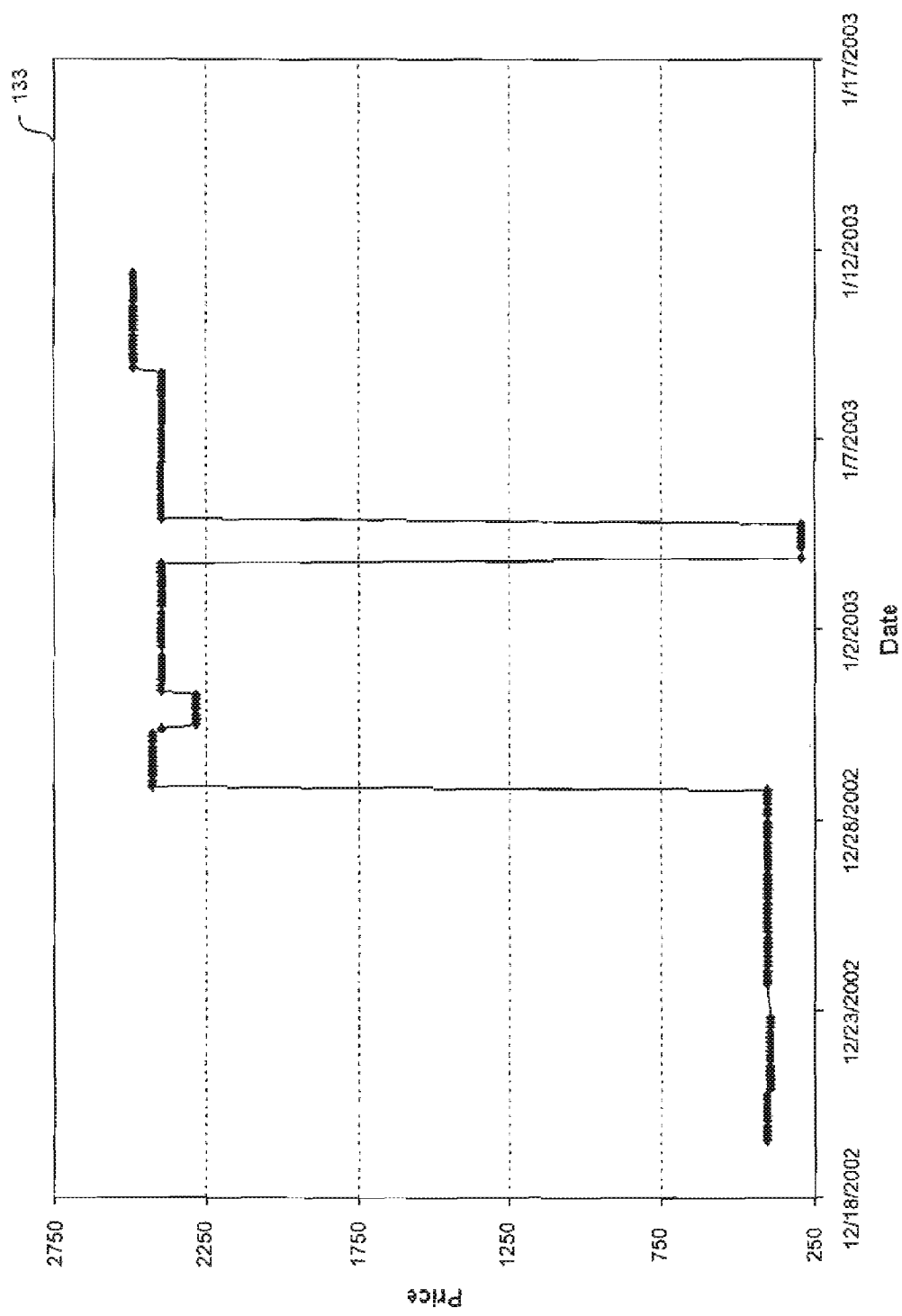
Figure 1E:
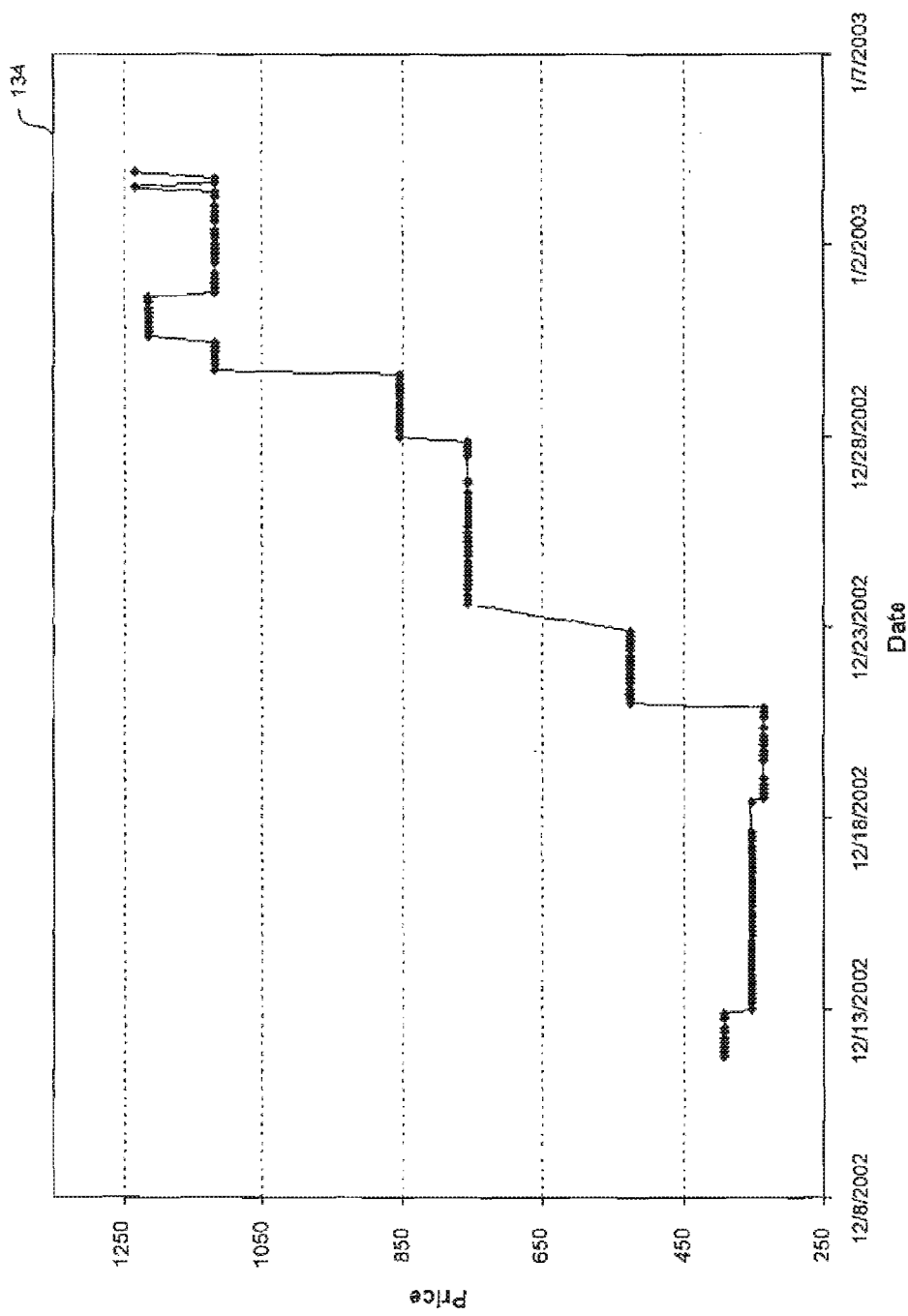

FIG. 1D illustrates an example of a chart 133 that provides an example of historical price information for a different airline flight, such as on a different route and/or from a different airline. In this example, there are two primary price tiers, but there is also a large drop in price in the middle of the second price tier (near the date of January 5 in this example). Thus, customers who express interest in the item near the beginning of the second price tier (e.g., around the dates of December 30-January 3) might pay a large price if they purchased immediately, but could significantly benefit by waiting to purchase the ticket during the later price drop. FIG. 1E illustrates yet another example chart 134 with example historical price information, which in this example shows a more gradual increase in price over time as the departure date approaches. A variety of other types of price change behavior could similarly occur.

Figure 1F:
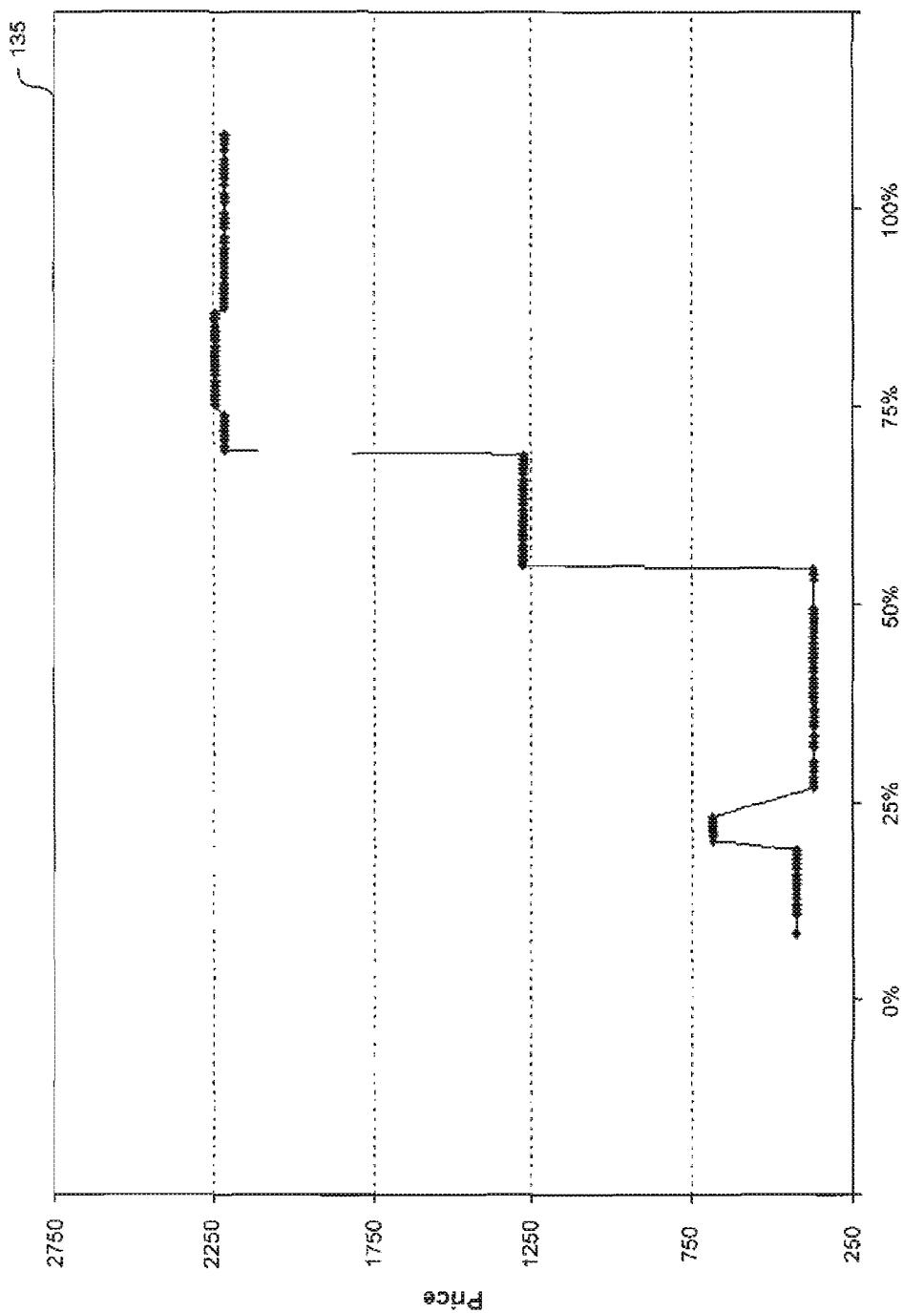

As illustrated in these examples, prices for airline tickets can change in various ways and based on various factors. For example, information other than an amount of time before departure can be a factor that affects price changes in at least some embodiments, and can thus be used as part of a later predictive pricing determination in those situations. For example, FIG. 1F illustrates an example chart 135 for the same flight previously discussed with respect to FIG. 1B, although in this example the price is shown as it varies based on factor of the availability of remaining seats on the flight. In other embodiments, however, such flight availability factor information may not be available and/or other additional factors could similarly be considered.

Figure 1G:
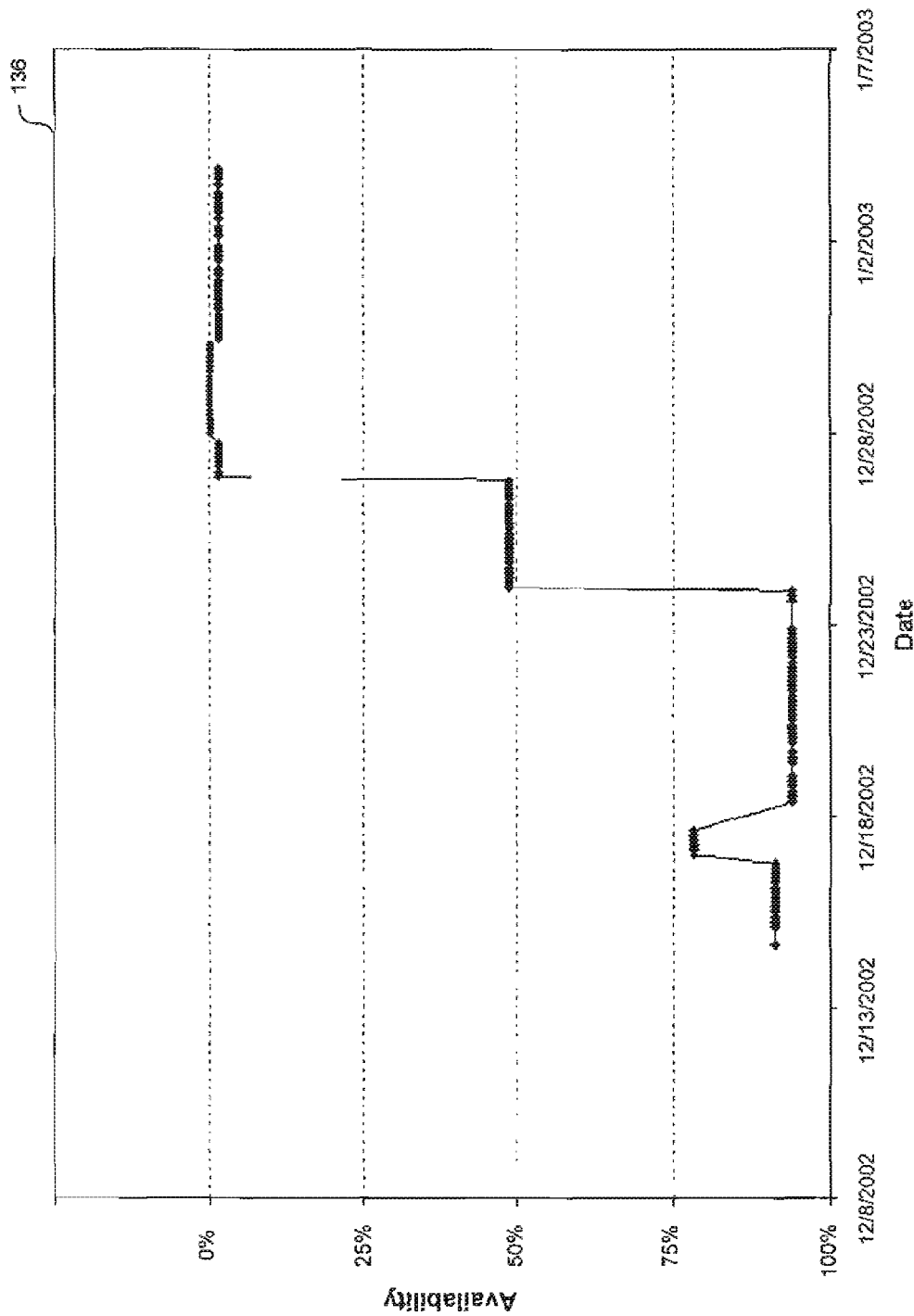

In a similar manner, the example chart 136 illustrated in FIG. 1G illustrates that information other than price may be tracked, analyzed and used in some embodiments, such as in this example displaying historical flight availability information for one or more flights (e.g., flights that depart on a particular day or instead on any of a group of similarly situated days). Such availability information may then be used in some embodiments to assist in a determination of whether a current price is currently a good buy, such as based on considering the likelihood of the flight selling out in the future. However, in embodiments where the price of an item typically already varies based on remaining availability, such as for airline tickets, availability information may instead be considered implicitly based merely on the price factor (e.g., if the availability does not independently affect a decision).

Figure 1H:
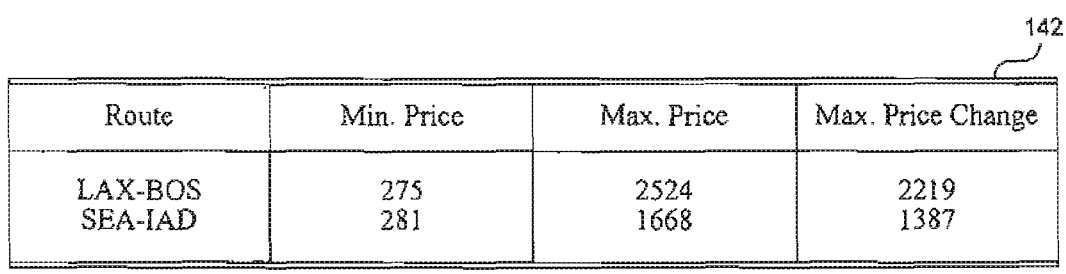
Figure 1I:
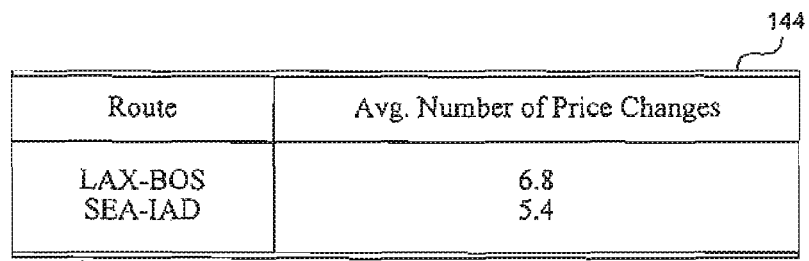

Thus, as previously indicated, historical price information for airline ticket prices can be illustrated in a graphical manner to show changes over time as the departure time nears. In addition, such historical data can also be analyzed in a variety of ways to provide other types of information that can assist in later performing predictive pricing. For example, with respect to FIG. 1H, example information is shown in table 142 that indicates a historical minimum price, maximum price, and maximum price change for particular routes. Similarly, FIG. 1I illustrates in table 144 an average number of price changes for particular routes. A variety of other types of analyses can similarly be performed related to price changes if the resulting information assists in predictive pricing and/or in providing advice based on current prices.

Once predictive pricing information is available, it can be used in a variety of manners to assist potential acquirers and/or providers of items. For example, FIG. 1J illustrates example information 159 that provides flight alternative information to a potential customer, such as via a Web page provided to the customer for display from an online travel agent. In this example, the provider of information is referred to as "Hamlet". In particular, in this example four alternative flight options 150 are displayed to the customer, such as by including them in search results in response to a prior request from the customer. The alternatives are listed in order from lowest price to highest price in this example, with the lowest price being $499 for alternative 150a. However, in this example the low price for alternative 150a corresponds to a special fare that is being offered to the customer by the travel agent, as is indicated to the customer in this example via notification 155 and is explained more fully to the customer if they select the control 156. In particular, alternative 150a corresponds to the same flight as that for alternative 150c, but the indicated price of $649 for alternative 150c reflects the actual price currently offered by the original supplier of this flight (in this example, Alaska Airlines). The special fare offered in this example for alternative 150a is instead based on predictive pricing for this flight, which in this example has provided an indication that a future price for this flight will be lower (e.g., as low as $499 if the travel agency plans to offer the full potential savings to the customer, lower than $499 if the travel agency plans to retain some of the potential savings, somewhat above $499 if the travel agency is willing to offer an additional discount to this customer and/or in this situation, etc.).

Thus, in this example the travel agency has elected to provide at least $150 worth of potential savings to the customer if the customer purchases now by offering a price to the customer that is lower than the price currently offered from the original supplier. If the customer then proceeds to purchase the flight for alternative 150a at the special fare, such as by selecting control 157, the travel agency may nonetheless wait until later to actually purchase a ticket for the customer on this flight, such as a later time when the actual price offered by the item supplier is lower. In this example, the customer is selecting a round-trip flight, and thus after selecting the control 157 for alternative 150a the customer will be prompted to provide information related to a return flight. If the customer was instead selecting a one-way trip or this was the last selection of a trip with multiple legs or segments, selection of a corresponding control by the customer could instead prompt the online travel agency to provide confirmation to the customer of their purchase having been completed at the indicated price of $499, even if the travel agency delays a purchase of tickets for the flight until later.

In other embodiments, explicit notification that the alternative 150a is a special fare might instead not be provided, such as by not showing alternative 150c with the actual current price offered by the original supplier airline, and instead merely listing a price for alternative 150a that is selected as satisfying one or more goals of the travel agency, such as to maximize profit (e.g., a price that is between the lowest predicted future price and the lowest actual current price offered by a supplier for one of the alternatives, such as in this example to be less than the $598 price for alternative 150b). Conversely, in some embodiments additional aspects related to the special fare may be conveyed to the customer, such as if any special fares selected by the customers for purchase are contingent on the travel agency acquiring the ticket under specified conditions (e.g., at or below a specified price and/or within a specified amount of rime). If so, the travel agency may not confirm purchase to the customer until after the ticket is actually acquired from a supplier.

FIG. 1K illustrates example information 169 that provides return flight information to the customer after selection of control 157 in FIG. 1J, including information 162 about that previously selected flight. The information includes two alternative return flights 160, with both of the alternatives in this example including a notification 165 that the indicated prices are special fares from the travel agent. In some embodiments, such notifications may further explicitly indicate to a customer that a special fare is based on predictive pricing, while in other embodiments such information may not be provided to the customer.

FIG. 1L illustrates example information 179 that provides alternative return flight information to the customer if the customer instead selected alternative 150b in FIG. 1J for the initial segment of the trip, including information 172 about that previously selected flight. In this example, three alternative return flights 170 are included, and an additional notification 177 is provided to the customer to remind them that a lower price trip is available based on the special fare offered by the travel agency. In addition, in this example the travel agency provides various other types of notifications based on the use of predictive pricing. For example, as indicated in information 178 and with notification 175, the current price of $598 round trip for flight alternative 170a is indicated in this example to be a good buy that may justify immediate purchase, such as due to the price being unlikely to fall but may possibly rise in the near future. In other embodiments, customers may instead be referred to an agent or a supplier from whom they can immediately acquire such good buy tickets, such as in exchange for a referral fee. In addition, in this example the travel agency further provides an option 176 to the customer that is also based on predictive pricing information—in particular, since in this example the predictive pricing indicates that the price is not likely to drop, the travel agency is willing to offer price protection insurance to the customer for a small fee, such that if the actual offered price drops after purchase the customer would then receive an additional benefit (e.g., a discount on their purchased price so as to reduce it to the lowest actual price that was offered). While the price protection insurance is offered to the customer for an additional fee in this example, in other embodiments such price protection insurance may not be offered or instead may be offered to a customer without additional explicit cost to the customer.

FIG. 1M illustrates example information 189a that provides return flight information to the customer if the customer instead selected alternative 150d in FIG. 1J for the initial segment of the trip, including information 182 about that previously selected flight. In particular, in this example three alternative return flights 180 are provided to the user, and predictive pricing information allows the travel agency to determine whether some or all of the alternatives are good fares or are otherwise good buys. However, in this example such additional information based on predictive pricing is available only to registered customers, and thus the information 189a includes indications 181a-181c to the user that they can obtain such notification information after they register (e.g., via selection of the control in section 183), such as based on a fee charged to the customer (e.g., a one-time fee or an ongoing subscription), or instead based on other benefits to the travel agency of such registration (e.g., obtaining additional information about the customers for use in better serving them and/or tailoring advertising or other information that will be displayed or otherwise provided to them). Alternatively, the initial registration may be free and may provide a basic level of information to a customer, while an upgrade to one or more premium fee-based registration services with additional information and/or functionality (e.g., to provide details and/or reasons about notifications, to provide alerting functionality, etc.) may additionally be available. Different types of services could also be used for different types of customers, such as individuals purchasing on their own behalf versus users acting on behalf of others (e.g., travel agents, corporate travel managers, etc.).

As noted above, in some embodiments and situations revenue may be derived through various types of advertising to users, such as advertising supplied interactively to users along with other supplied information (e.g., as banner or pop-up ads, sponsored listings in search results, paid inclusion for search or other results, etc.), advertising supplied or otherwise made available to users in a non-interactive manner (e.g., permission-based or other email or other forms of notification) such as based on demographic and/or personal preference information for the users, etc. Similarly, in some embodiments and situations revenue may be derived through other uses of information about users themselves and/or about purchase-related activities of such users, including selling or otherwise providing such information to third-parties (e.g., with permission of the users).

FIG. 1N illustrates information 189b that is similar to that displayed with respect to FIG. 1M, but which includes alternative types of notifications to the customer for the return flight alternatives. For example, these alternative notifications may be provided to the customer after they complete the registration process with respect to FIG. 1M. In particular, example notification 184a provides additional information to a user for a particular flight, such as to buy the flight at the current price now because the price is not likely to drop and the flight may soon sell out. Conversely, notification 184b indicates to the customer to hold off on purchasing the indicated flight at its current price, as the price of that flight is likely to drop in the future. Notification 184c indicates for its alternative flight that the price is not likely to rise or drop, and thus advice on whether to purchase immediately cannot be made based purely on price information. In other alternatives, yet other types of information could be provided, such as by including information in alternative 184b that further indicates to the customer a length of time that the customer should wait before purchasing and/or a price or price range for which the customer should wait before completing the purchase.

While not illustrated here, advice could also be provided to customers in a variety of ways other than as part of an interactive response to the customer. For example, various types of alerts could instead be provided to a customer in a manner initiated by the travel agency or a related system with access to the airline price information, such as for alternative 150a in FIG. 1J if the customer had previously requested information on special fares for this flight or on fares below $500 for any flights between Seattle and Boston. Such alerts could take a variety of forms, including e-mail, instant message, a phone call, fax, etc. In addition, in other alternatives the travel agent and/or an independent agent acting on behalf of the customer could automatically purchase a flight when it met certain criteria for the customer, including if the flight is determined to be a good buy.

FIG. 1O illustrates example information 199 showing another alternative for using predictive pricing information to assist customers and/or sellers. In particular, in this example information is shown that is similar to that illustrated in FIG. 1J, but with only two alternatives illustrated to the customer. The top alternative in this example corresponds to the same flight that was previously indicated to be alternative 150a in FIG. 1J, but in this example a specific special fare is not offered to the customer based on the predictive pricing. Instead, as indicated by the customer-selectable control 193, the customer is in this example offered the opportunity to offer a named price for the particular flight shown. In addition, the displayed information to the customer further includes an indication of a second alternative flight, which in this example does not include the name-your-price functionality, although the specific offered price does provide context to the customer of other current prices offered for competitive flights—in other embodiments, such additional information may instead not be provided. In this example, if the customer selects the control 193 and offers a price above $499 (the special fare in FIG. 1J for this flight), the travel agency may accept that offer even though it is below the current price offered for the flight of $649. In other alternatives, customers could name prices for flights at varying degrees of specificity, such as any flight that is sufficiently similar to previously indicated search criteria by the customer, flights on a specified airline but not limited to a particular flight, etc. In addition, customers could similarly purchase items using other purchase models that similarly use predicted price information, such as based on various auction-related purchase models.

Thus, FIGS. 1J-1O provide examples of specific types of functionality that may be provided to customers by intermediate sellers based on the use of predictive pricing information, although in other embodiments such predictive pricing information could be used in other ways. Also, as was shown in these examples, the predictive pricing information allows different types of functionality to be offered to different types or categories of customers. For example, the special fares and general notifications of whether a flight is a good buy may be of interest to bargain and value shoppers. Similarly, the name-your-price model may allow such customers to save money, while also being able to specify flights at a much more detailed level than is currently provided in the marketplace (e.g., by Priceline), which provides less uncertainty and less restrictions for the customers. Conversely, frequent travelers may prefer to obtain additional information related to predictive pricing, such as details and/or reasons related to why a flight is a good buy, or specific recommendations on how to obtain potential savings when the future price may drop—if so, such additional information may be available to them for an additional fee, such as based on a premium registration service. In addition, professionals that represent other travelers (e.g., travel agents, in-house corporate travel managers, etc.) may want even more information and/or the ability to obtain predictive pricing information in high volume and/or in bulk, such as for additional fees.

Figure 2:
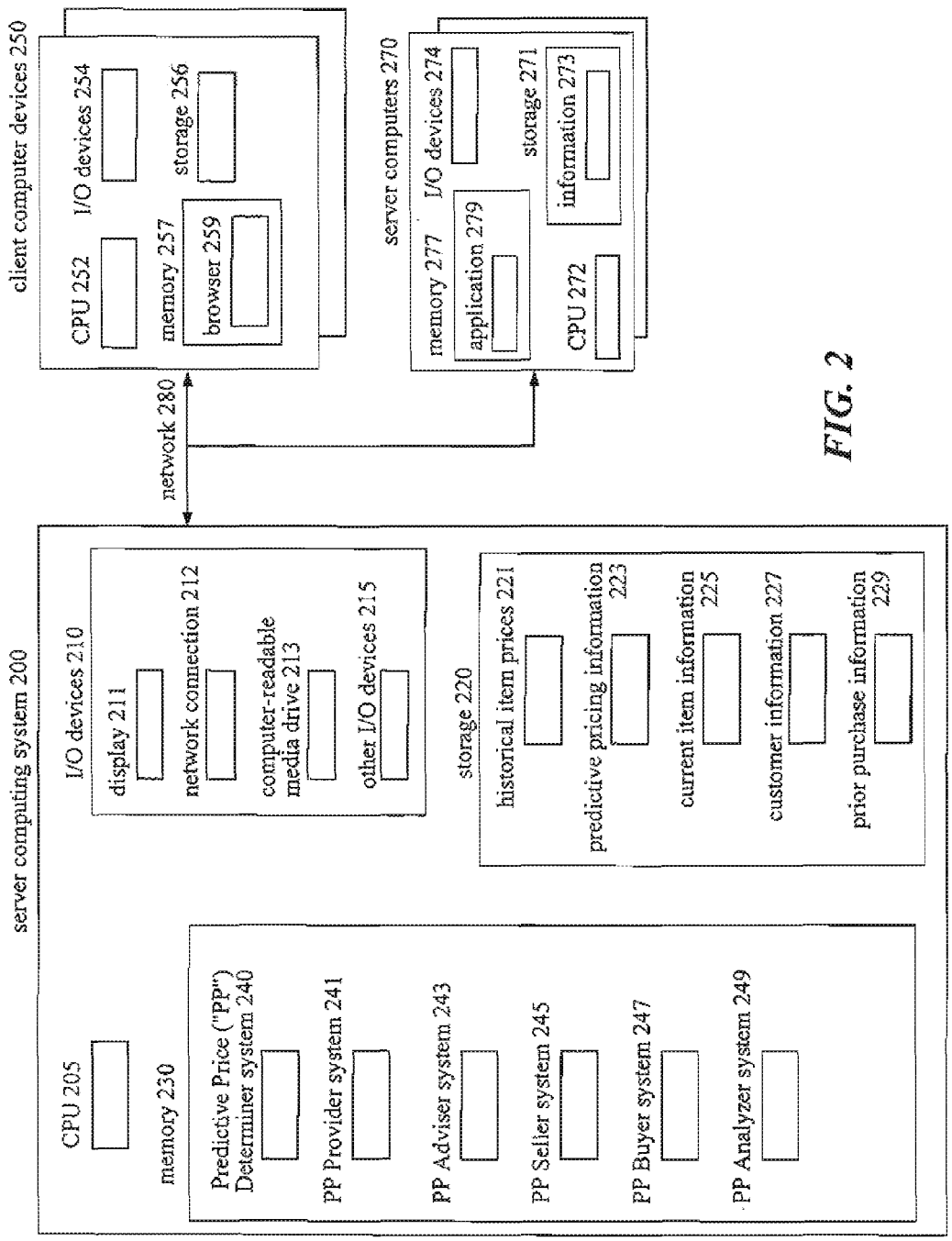
FIG. 2 is a block diagram illustrating an embodiment of a computing system suitable for providing and using disclosed techniques related to predictive pricing.

FIG. 2 illustrates a server computing system 200 suitable for executing embodiments of one or more software systems/modules that perform analyses related to predictive pricing information. The example server computing system includes a CPU 205, various I/O devices 210, storage 220, and memory 230. The I/O devices include a display 211, a network connection 212, a computer-readable media drive 213, and other I/O devices 215.

A Predictive Pricing ("PP") Determiner system facility 240 is executing in memory 230 in this example in order to analyze historical price data and determine predictive pricing information. Similarly, a PP Provider system facility 241 is executing in memory 230 in order to provide predictive pricing information relative to current items on request, such as to users (e.g., buyers and/or sellers) and/or to other system facilities that use that information to provide various services to users.

As the PP Determiner system executes in memory 230, it analyzes various historical item price information, such as that available in a database 221 of storage 220 or instead as obtained from another executing system or remote storage location. After analyzing the historical price information, such as at the request of a user or instead on a scheduled basis, the PP Determiner system determines various predictive pricing information related to the historical item prices (e.g., underlying factors that affect price changes, various patterns or other information about price changes relative to the factors, policies related to responding to current factors, etc.). The system then in the illustrated embodiment stores the determined information in a database 223 on storage, although in other embodiments the system could provide the information interactively to a user or other executing system. In some embodiments and/or situations, the PP Determiner system could also obtain historical price information for use in its analysis by repeatedly querying an external supplier of such information to obtain then-current information, and could then analyze the obtained information, whether dynamically as it is obtained or instead later after a sufficient amount of historical price information has been gathered or on a periodic basis. Such external information sources could be accessed in a variety of ways, such as via one or more server computers 270 over a network 280 (e.g., to retrieve stored information 273 directly and/or via interaction with an application 279 executing in memory).

When predictive pricing information is available, whether via previously stored information in database 223 or in response to a query to the PP Determiner system, the PP Provider system facility 241 executing in memory 230 can obtain and provide predictive pricing information (e.g., for a specified item or group of items), such as in response to a request from a user or other executing system facility. In this illustrated embodiment, example system facilities 243-249 are executing in memory 230 to provide functionality based on predictive pricing information, and thus may provide such requests to the PP Provider system, although in other embodiments some or all of those additional system facilities may instead be executing remotely or may not be present. In this illustrated embodiment, the PP Provider system provides predictive pricing information for a request by obtaining information about predicted future prices for the item as discussed above, by analyzing and modifying the obtained information if needed, and providing information about those predicted future prices. In some embodiments, the system 241 could further obtain, use and provide current pricing information for the items, such as from a current item information database 225 on storage 220, while in other embodiments the PP Provider system may instead obtain and provide predictive pricing information based merely on various current factors for an item, such as those supplied in the request or instead otherwise obtained by the PP Provider system (e.g., from the database 225).

In particular, as one example of a system facility that can obtain and use predictive pricing information, the PP Advisor system facility 243 is executing in memory 230. In response to an indication to provide advice, such as based on an interactive request from a customer or instead based on a scheduled indication to determine whether to provide an alert to a customer based on a previously received request, the PP Advisor system obtains predictive pricing information for one or more items, such as by interacting with the PP Provider system. The PP Advisor system also obtains current price information for those items, and then determines one or more types of advice to provide to an appropriate customer based on that information. In some embodiments, the advice is provided via notifications interactively displayed to the customer that indicate information about current item prices to advise the customer. In other embodiments, the advice may be provided in other forms, such as via an alert sent to a registered customer. Various information about customers may be stored and used when providing advice, such as in a customer database 227 on storage 220, in other to determine when, whether, and how to provide notification to a customer in accordance with their preferences and interests.

As another example of a system facility that uses predictive pricing information, the illustrated embodiment further includes a PP Seller system facility 245 executing in memory 230. The PP Seller system obtains predictive pricing information for one or more items, such as from the PP Provider system, as well as current price information for the items. The PP Seller system then assists a seller (e.g., an intermediate seller) in using the predictive pricing information in one or more of a variety of ways, such as to determine whether and when to offer prices to customers that are lower than prices currently offered by suppliers of items, to accept bids or offers from customers that are lower than prices currently offered by item suppliers but higher than predicted lower future prices for the items, to delay an actual purchase of one or more items from item suppliers that have been purchased from the seller by customers, etc.

The PP Buyer system facility 247 is another example of a system facility executing in memory 230 in the illustrated embodiment that can obtain and use predictive pricing information in order to enable better buying decisions, in this situation by directly assisting buyers (e.g., bulk buyers). In particular, the PP Buyer system obtains predictive pricing information for one or more items, such as from the PP Provider system, as well as current price information for those items. The PP Buyer system facility then assists the buyer in determining whether and when to make purchasing decisions, such as to delay purchases based on predicted future price drops and/or to aggregate multiple purchases together to provide additional benefits, to hedge against such delays by purchasing some items immediately and delaying others, to negotiate with an intermediate seller or item supplier for lower prices based on predicted future price drops, to immediately purchase items that are not otherwise immediately needed based on predicted future price increases, etc.

The PP Analyzer system facility 249 is another example system executing in memory 230 that uses predictive pricing information to provide benefits to customers or other users. The PP Analyzer system analyzes prior purchase information, such as that stored in database 229 on storage 220 or instead as interactively supplied by a user making a request, in order to determine whether the prior purchasing decisions were made effectively. In particular, the PP Analyzer system obtains information about pricing information that would have been predicted for those items at the time of purchase, such as from the PP Provider system, and then compares the actual purchase decisions made to the decisions that would have been advised based on use of the predictive pricing information. In some embodiments, the PP Analyzer system further may obtain historical price information for the purchase items (e.g., from the database 221) that corresponds to offered prices after the purchase date but before a date that the item is needed, such as to determine whether the actual purchase prices were higher than an optimal purchase price that was available. The PP Analyzer system can then provide information about the analysis performed to assist in better future buying decisions.

Those skilled in the art will appreciate that computing systems and devices 200, 250 and 270 are merely illustrative and are not intended to limit the scope of the present invention. Computing system 200 may be connected to other devices that are not illustrated, including through one or more networks such as the Internet (e.g., via the World Wide Web ("Web")) or other computer network. More generally, a "client" or "server" may comprise any combination of hardware or software that can interact in the indicated manner, including computers, network devices, internet appliances, PDAs, wireless phones, pagers, electronic organizers, television-based systems and various other consumer products that include inter-communication capabilities. In addition, the functionality provided by the various system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components may execute in memory on another device and communicate with the illustrated computing device via inter-computer communication. Some or all of the system components or data structures may also be stored (e.g., as instructions or structured data) on a computer-readable medium, such as a hard disk, a memory, a network, or a portable article to be read by an appropriate drive. The system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 3:
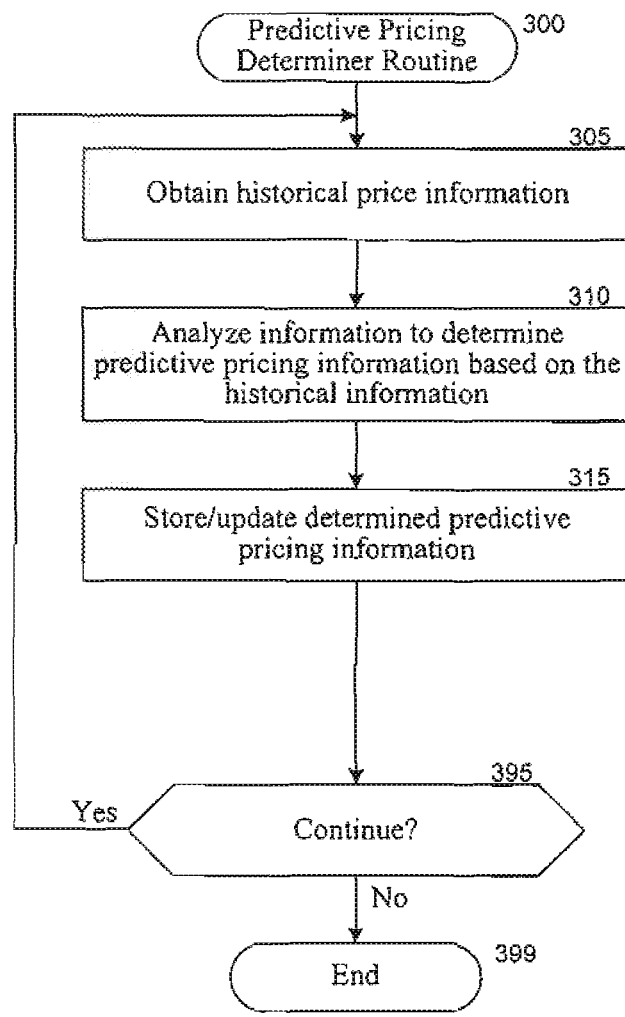
FIG. 3 is a flow diagram of an embodiment of a Predictive Pricing Determiner routine.

FIG. 3 is a flow diagram of an embodiment of a Predictive Pricing Determiner routine 300. The routine begins at step 305, where historical pricing information is obtained for one or more items, and continues to step 310 to analyze the data to determine predictive pricing information based on the historical data. In step 315, the routine then stores or updates previously stored predictive pricing information from the analysis in step 310. After step 315, the routine continues to step 395 to determine whether to continue. If so, the routine returns to step 305, and if not the routine continues to step 399 and ends.

Figure 4:
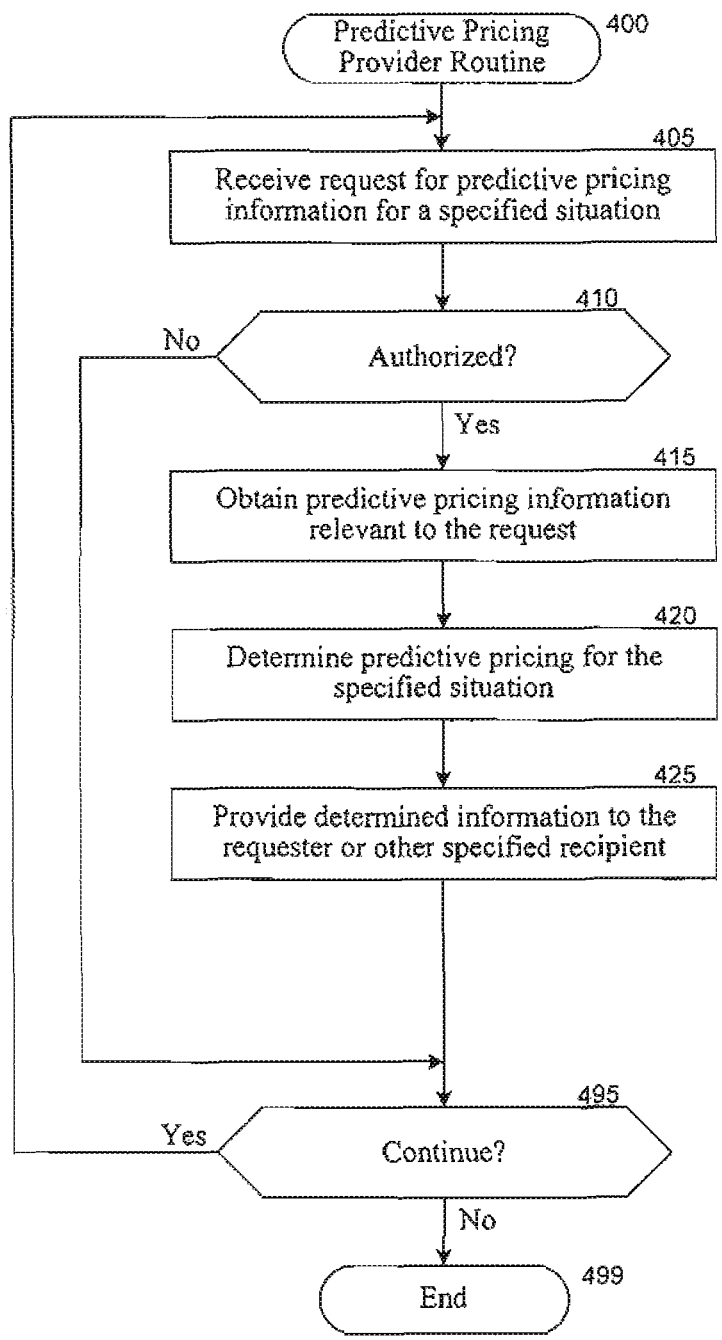
FIG. 4 is a flow diagram of an embodiment of a Predictive Pricing Provider routine.

FIG. 4 is a flow diagram of an embodiment of a Predictive Pricing Provider routine 400. While illustrated here as a routine that is separate from the Predictive Pricing Determiner routine, as well as from other later-discussed routines that use the provided determined information, the routine could instead in other embodiments be incorporated together with one or more such other routines.

The routine begins in step 405, where a request is received for predictive pricing information for one or more specified items and/or a specified situation. The routine continues to step 410 to determine whether the requestor is authorized to receive the requested information, such as for a registered customer (whether directly or via another system facility acting as an intermediary on behalf of that customer). If so, the routine continues to step 415 to obtain corresponding predictive pricing information, such as by retrieving stored information or instead by interactively requesting the PP Determiner to provide the information. After step 415, the routine continues to step 420 to determine predictive pricing specific to the request based on the retrieved information, such as one or more specific predicted future prices, a predicted future price pattern, a predicted future direction, predictions about specific times in the future corresponding to predictive prices, etc. While not illustrated here, in some embodiments the routine may further obtain information about current prices for the items, such as to assist in the predictive pricing (e.g., to determine a future price relative to the current price) and/or to enable comparison between the current and predicted future prices. After step 420, the routine continues to step 425 to provide the determined information to the requestor. After step 425, or if it was instead determined in step 410 that the requestor was not authorized, the routine continues to step 495 to determine whether to continue. If so, the routine returns to step 405, and if not the routine continues instead to step 499 and ends.

Figure 5:
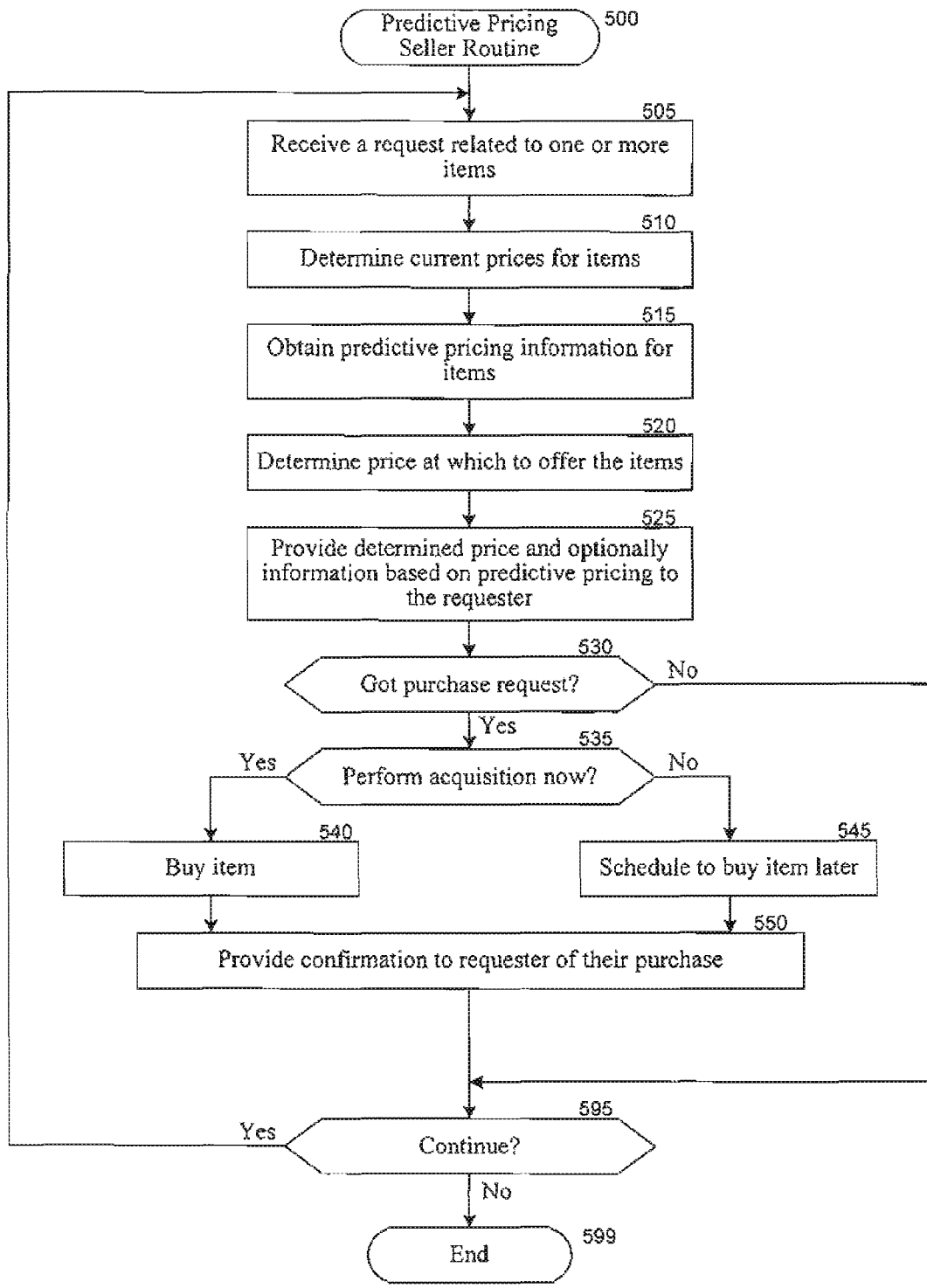
FIG. 5 is a flow diagram of an embodiment of a Predictive Pricing Seller routine.

FIG. 5 is a flow diagram of an embodiment of a Predictive Pricing Seller routine 500. The routine obtains predictive pricing information for one or more items, and uses the information to assist a seller (e.g., an intermediate seller) to perform selling decisions in one or more of a variety of ways.

The routine begins in step 505, where a request is received related to one or more items. In step 510, the routine determines current prices for the items, and in step 515 obtains predicted prices for the items, such as by interacting with the PP Provider routine. In step 520, the routine then determines a price at which to currently offer the items based on the current prices and/or the predicted future prices, and in step 525 provides information about the determined offer and price to the requestor. In other embodiments, a variety of other additional types of functionality could be provided, such as to determine whether to offer price protection insurance to a requestor based on the current prices and/or the predicted future prices. In addition, the determination of the price at which to offer an item can be made in various ways, such as to select prices lower than current offer prices based on predicted future prices dropping, or instead in some embodiments by negotiating with a supplier of the items to obtain a lower offered price from the supplier based on predicted lower future prices.

After step 525, the routine continues in step 530 to determine whether the requestor is interested in purchasing or otherwise acquiring one or more of the items at one of the offered prices. If so, the routine continues to step 535 to determine whether to fulfill the requester's acquisition by actually acquiring the item from an item supplier now or instead by waiting until later (e.g., based on a predicted lower future price). If it is determined that it is preferable to buy now, the routine continues to step 540 to buy the item, and otherwise the routine continues to step 545 to store information about the item and to optionally schedule a later time to buy the item (e.g., to reflect a time at which it is predicted that the price will be lower, or instead to periodically check for lower prices). In some embodiments, the decision to delay a purchase may further be made at least in part on the basis of a goal to aggregate multiple item purchase requests (e.g., for the same item, for related items such as items from a single supplier, etc.) in order to perform hedge activities or otherwise negotiate discounts. After steps 540 or 545, the routine continues to step 550 to provide confirmation to the requestor of the requestor's purchase. In situations in which the item has already been bought or is otherwise available, the item may in addition be supplied to the purchaser at this time, while in other situations (e.g., when the actual purchase is delayed), the supplying of the item may similarly be delayed. After step 550, or if it was instead determined in step 530 not to make a purchase, the routine continues in step 595 to determine whether to continue. If so, the routine returns to step 505, and if not the routine continues to step 599 and ends.

Figure 6:
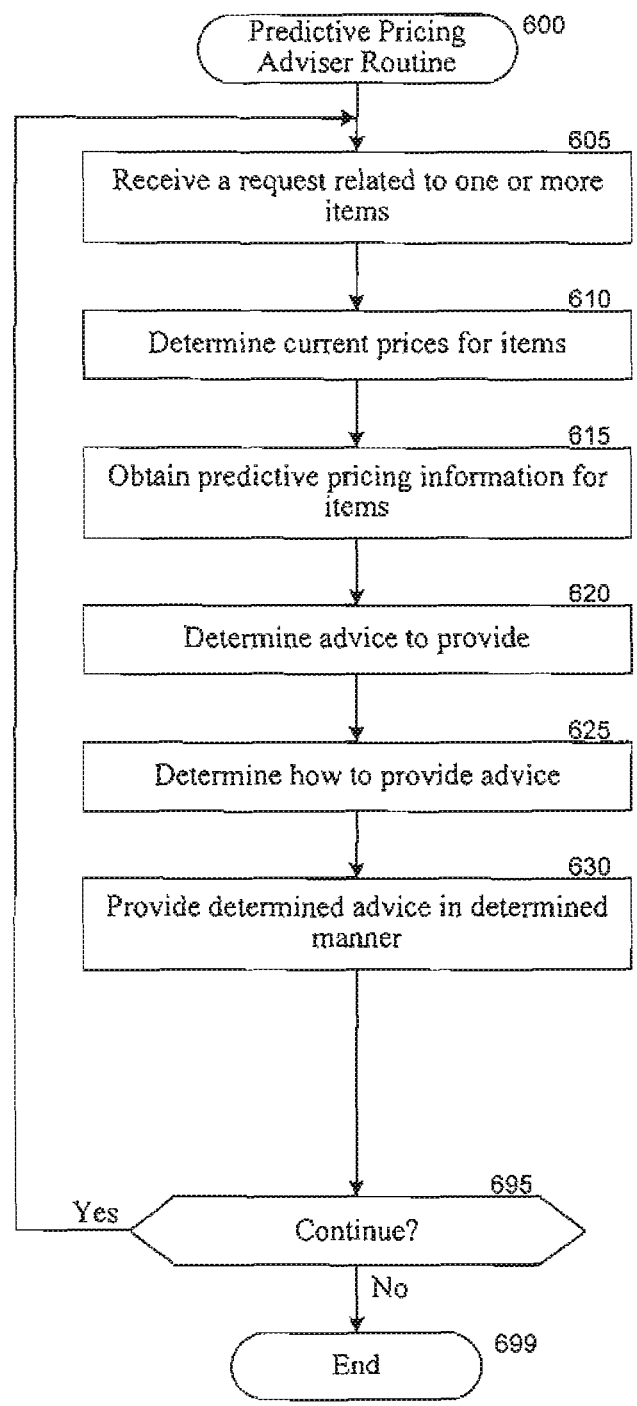
FIG. 6 is a flow diagram of an embodiment of a Predictive Pricing Advisor routine.

FIG. 6 is a flow diagram of a Predictive Pricing Advisor routine 600. The routine obtains predictive pricing information for items and uses the information to provide advice, such as to customers.

The routine begins in step 605, where a request is received related to one or more items. In the illustrated embodiment, the routine is illustrated as providing advice in an interactive manner, although in other embodiments such requests could be for future alerts and could be stored for periodic or scheduled processing to satisfy the requests. After step 605, the routine continues in step 610 to determine current prices for the items corresponding to the request, and in step 615 to obtain predicted prices for the items, such as by interacting with the PP Provider routine. In step 620, the routine determines what advice to give, such as based on a comparison of the current price to the predicted future price and on any other available information. The routine then continues to step 625 to determine how to provide the advice, such as via a notification displayed to the user along with other information or instead by alerting the user proactively in one or more of a variety of ways. After step 625, the routine continues to step 630 to provide the determined advice to the customer in the determined manner. In step 695, the routine then determines whether to continue. If so, the routine returns to step 605, and if not the routine continues to step 699 and ends.

Figure 7:
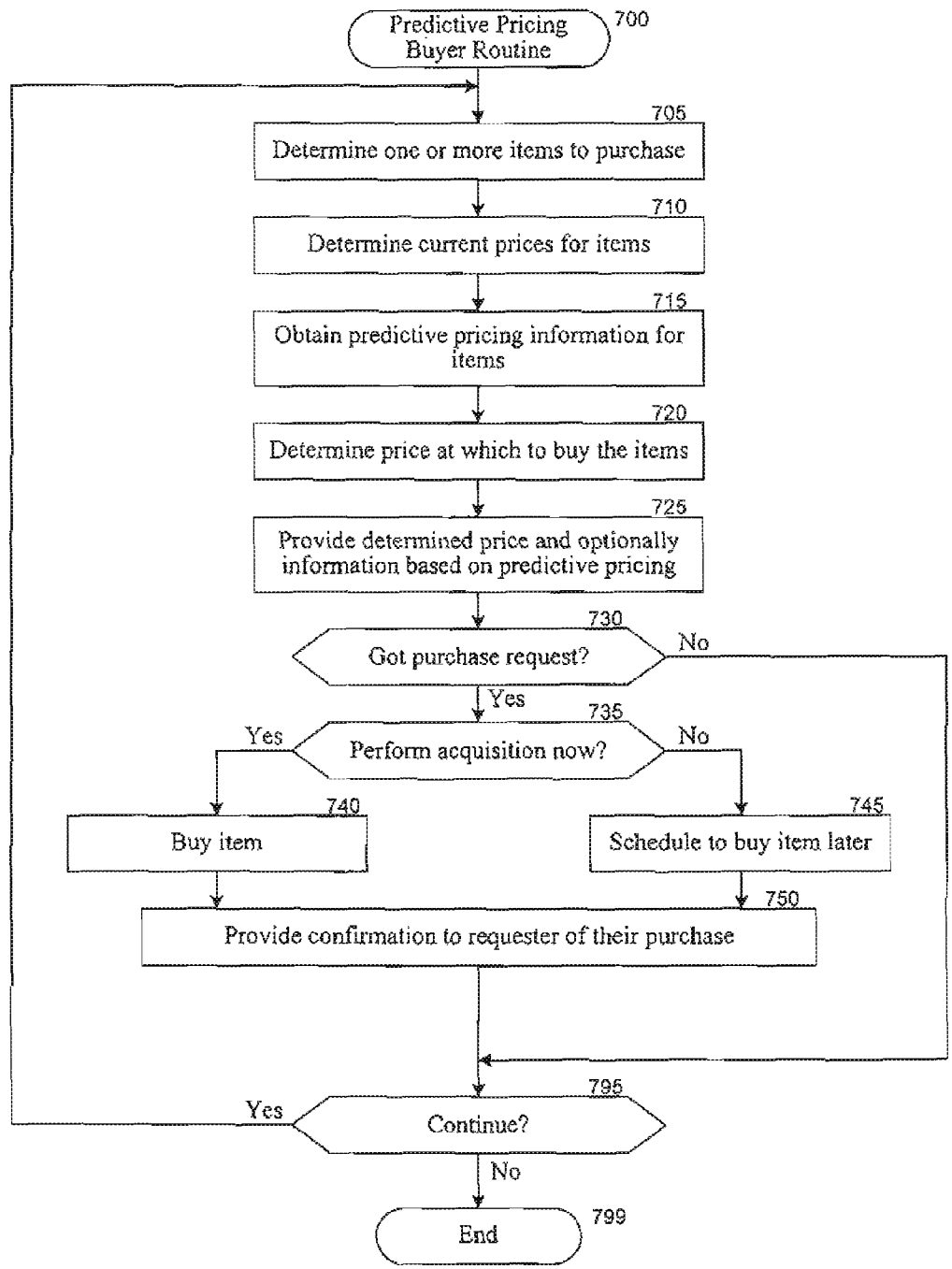
FIG. 7 is a flow diagram of an embodiment of a Predictive Pricing Buyer routine.

FIG. 7 is a flow diagram of an embodiment of a Predictive Pricing Buyer routine 700. The routine obtains and uses predictive pricing information for items in order to assist buyers in making buying decisions, such as for bulk buyers.

The routine begins In step 705, where one or more items of interest to purchase are determined, such as based on a request received from a user. In step 710, the routine determines current prices for the items, and in step 715 obtains predicted prices for the items, such as by interacting with the PP Provider routine. In step 720, the routine determines a price at which to buy some or all of the items and a time at which such purchases should be made. In some embodiments, such a determination could be made by interactively negotiating with an item supplier or intermediate seller in order to obtain discounted prices based on predicted lower future prices, while in other embodiments the determined may be made based on other factors. Similarly, some or all of such items could be determined to have their purchases held until later in order to aggregate for various purposes, such as for a consolidator. In step 725, the routine then provides information about the determined price and optionally additional information about the predictive pricing in an appropriate manner, such as by providing the information to a requester from step 705.

After step 725, the routine continues in step 730 to determine whether an appropriate user is interested in purchasing or otherwise acquiring one or more of the items at one of the offered prices, such as based on a received request. If so, the routine continues to step 735 to determine whether to fulfill that acquisition by actually acquiring the item from an item supplier now or instead by waiting until later (e.g., based on a predicted lower future price). If it is determined that it is preferable to buy now, the routine continues to step 740 to buy the item, and otherwise the routine continues to step 745 to store information about the item and to optionally schedule a later time to buy the item (e.g., to reflect a time at which it is predicted that the price will be lower, or instead to periodically check for lower prices). In some embodiments, the decision to delay a purchase may further be made at least in part on the basis of a goal to aggregate multiple item purchase requests in order to perform hedge activities or otherwise negotiate discounts. After steps 740 or 745, the routine continues to step 750 to provide confirmation of the requested acquisition. After step 750, or if it was instead determined in step 730 not to make a purchase, the routine continues in step 795 to determine whether to continue. If so, the routine returns to step 705, and if not the routine continues to step 799 and ends.

Figure 8:
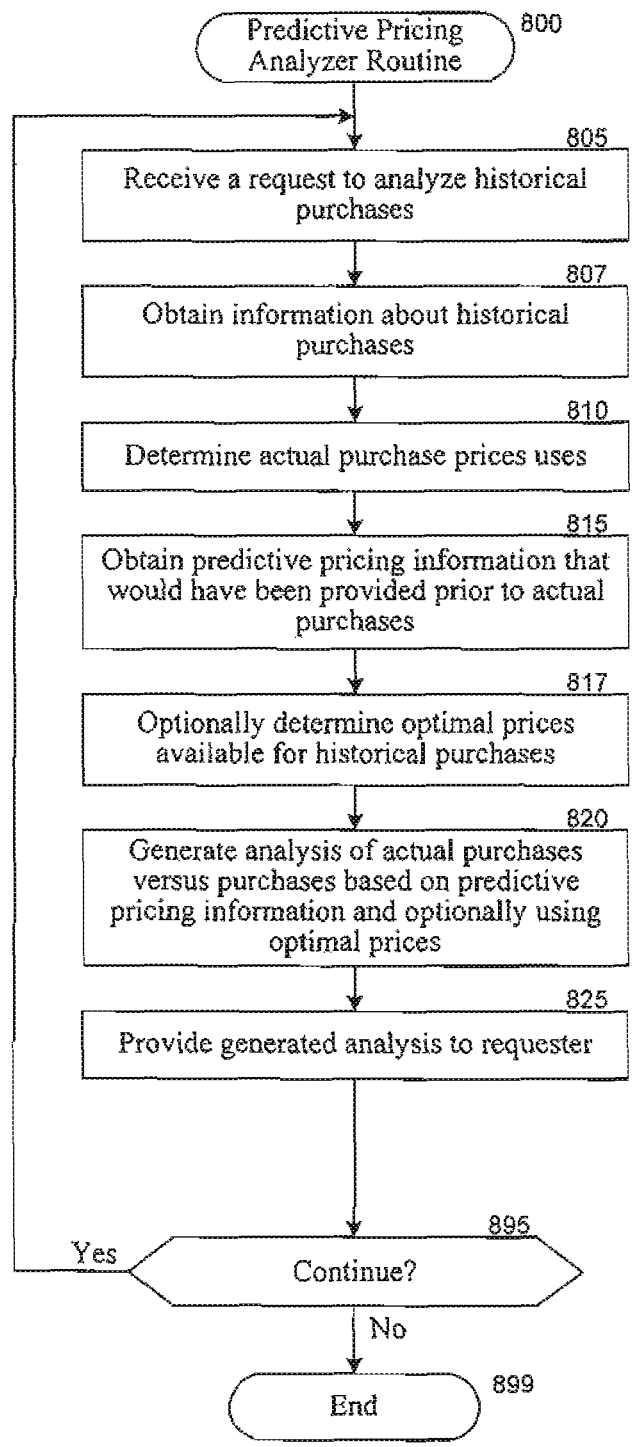
FIG. 8 is a flow diagram of an embodiment of a Predictive Pricing Analyzer routine.

FIG. 8 is a flow diagram of an embodiment of a Predictive Pricing Analyzer routine 800. The routine obtains predictive pricing information for items that corresponds to prior purchases of those items, and uses the predictive pricing information to analyze whether the buying decisions could have been performed more efficiently based on the predictive pricing. In addition, in the illustrated embodiment the routine further compares the previously purchased item prices to later actually available prices in order to determine how the actual and/or predicted prices compare to optimally available prices, although in other embodiments such use of actual later price information may not be used.

In step 805, a request is received to analyze historical purchases of items, and in step 807 the routine obtains information about the historical purchases, although in other embodiments such information may instead be supplied as part of the request in step 805. In step 810, the routine determines the purchase prices for the items, and in step 815 determines the predicted prices that would have been made for those items at that time (e.g., based on data that was then available and/or a version of predictive pricing techniques that were then used), such as based on interactions with the PP Provider routine. In step 820, the routine then generates an analysis of the actual prior purchase prices versus the prices that would have been obtained based on following the predictive pricing advice that would have been provided at that time, and in the illustrated embodiment further generates an analysis based on a comparison to the optimal price that could have been obtained based on other actual offered prices (e.g., before and/or after the time of actual purchase). In step 825, the routine then continues to provide the generated analysis to the requestor. After step 825, the routine continues to step 895 to determine whether to continue. If so, the routine returns to step 805, and if not the routine continues to step 899 and ends.

In a similar manner, this or a related routine could use predictive pricing information to assist a user in analyzing historical and/or recent/current pricing information for a specified group of one or more item suppliers, such as on behalf of an item supplier to analyze pricing information for one or more competitors and/or affiliated business entities (e.g., customers, suppliers, partners, etc.). When performed with respect to recent/current pricing information for one or more competitors, for example, such predictive pricing information may allow a user to anticipate likely price changes for those competitors and use that information to guide their own actions, whether in advance of any such actions by the competitors or instead as a response (e.g., an immediate response) if such actions by the competitors occur. If performed in advance, the user may be able to gain a first-mover advantage by use of the predictive pricing information.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

Appendix A provides additional details related to one example of techniques for performing predictive pricing, which in that illustrative example are in the context of airline ticket prices. In addition, those skilled in the art will appreciate that a variety of similar techniques could instead be used in alternative embodiments. Some such additional techniques are discussed generally in "Machine Learning" by Torn M. Mitchell, McGraw-Hill Companies Inc., 1997, which is hereby incorporated by reference in its entirety. The following paragraphs are excerpts from Appendix A.

As product prices become increasingly available on the World Wide Web, consumers attempt to understand how corporations vary these prices over time. However, corporations change prices based on proprietary algorithms and hidden variables (e.g., the number of unsold seats on a flight). Is it possible to develop data mining techniques that will enable consumers to predict price changes under these conditions?

Data Collection

We collected airfare data directly from a major travel web site. In order to extract the large amount of data required for our machine learning algorithms, we built a flight data collection agent that runs at a scheduled interval, extracts the pricing data, and stores the result in a database. We built our flight data collection agent using AgentBuilder (www.fetch.com) for wrapping web sites and Theseus for executing the agent. (G. Barish and C. A. Knoblock, An efficient and expressive language for information gathering on the web. In *Proceedings of the AIPS*-2002 *Workshop on Is there life after operator sequencing?—Exploring real world planning*, pages 5-12, Tolouse, France, 2002.) AgentBuilder exploits machine learning technology (C. A. Knoblock, K. Lerman, S. Minton, and I. Muslea, Accurately and reliably extracting data from the web: A machine learning approach. In P. S. Szczepaniak, J. Segovia, J. Kacprzyk, and L. A. Zadeh, editors, *Intelligent Exploration of the Web*, pages 275-287. Springer-Verlag, Berkeley, Calif. 2003.) that enables the system to automatically learn extraction rules that reliably convert information presented on web pages into XML. Once the system has learned the extraction rules, AgentBuilder compiles this into a Theseus plan. Theseus is a streaming dataflow execution system that supports highly optimized execution of a plan in a network environment. The system maximizes the parallelism across different operators and streams data between operations to support the efficient execution of plans with complex navigation paths and extraction from multiple pages.

For the purpose of our pilot study, we restricted ourselves to collecting data on non-stop, round-trip flights for two routes: Los Angeles (LAX) to Boston (BOS) and Seattle (SEA) to Washington, D.C. (IAD). Our departure dates spanned January 2003 with the return flight 7 days after departure. For each departure date, we began collecting pricing data 21 days in advance at three-hour intervals; data for each departure date was collected 8 times a day. (We expected to record 168 (21*8) price observations for each flight. In fact, we found that on average each flight was missing 25 observations due to problems during data collection including remote server failures, site changes, wrapper bugs, etc.) Overall, we collected over 12,000 fare observations over a 41 day period for six different airlines including American, United, etc. We used three-hour intervals to limit the number of http requests to the web site. For each flight, we recorded the lowest fare available for an economy ticket. We also recorded when economy tickets were no longer available; we refer to such flights as sold out.

Pricing Behavior in Our Data

We found that the price of tickets on a particular flight can change as often as seven times in a single day. We categorize price change into two types: dependent price changes and independent price changes. Dependent changes occur when prices of similar flights (i.e. having the same origin and destination) from the same airline change at the same time. This type of change can happen as often as once or twice a day when airlines adjust their prices to maximize their overall revenue or "yield." Independent changes occur when the price of a particular flight changes independently of similar flights from the same airline. We speculate that this type of change results from the change in the seat availability of the particular flight. Table 1 shows the average number of changes per flight aggregated over all airlines for each route. Overall, 762 price changes occurred across all the flights in our data. 63% of the changes can be classified as dependent changes based on the behavior of other flights by the same airline.

TABLE 1

Average number of price changes per route.

| Route | Avg. number of price changes |
|---|---|
| LAX-BOS | 6.8 |
| SEA-IAD | 5.4 |

We found that the round-trip ticket price for flights can vary significantly over time. Table 2 shows the minimum price, maximum price, and the maximum difference in prices that can occur for flights on each route.

TABLE 2

Minimum price, maximum price, and maximum change in ticket price per route.

| Route | Min Price | Max Price | Max Price Change |
|---|---|---|---|
| LAX-BOS | 275 | 2524 | 2249 |
| SEA-IAD | 281 | 1668 | 1387 |

For many flights there are discernible price tiers where ticket prices fall into a relatively small price range. The number of tiers typically varies from two to four, depending on the airline and the particular flight. Even flights from the same airline with the same schedule (but with different departure dates) can have different numbers of tiers. For example, there are two price tiers for the flight in FIG. 1D, four price tiers in FIG. 1E and three price tiers in FIG. 1C and FIG. 1B.

Price matching plays an important role in airline pricing structure. Airlines use sophisticated software to track their competitors' pricing history and propose adjustments that optimize their overall revenue. To change the price, airlines need to submit the change to the Airline Tariff Publishing Company (ATPCO) (see http://www.atpco.net), the organization formed by leading airlines around the world that collects and distributes airline pricing data. The whole process of detecting competitors' fare changes, deciding whether or not to match competitors' prices, and submitting the price update at ATPCO can take up to one day (S. McCartney, Airlines Rely on Technology To Manipulate Fare Structure. *Wall Street Journal*, Nov. 3, 1997.)

Price changes appear to be fairly orderly on some flights (e.g., FIG. 1B), and we see evidence of the well-known 7 and 14 day "advance purchase" fares. However, we also see plenty of surprising price changes. For example, flights that depart around holidays appear to fluctuate more (e.g., FIG.

1C). FIG. 2 and FIG. 1B show how pricing strategies differ between two flights from American Airlines that have the same schedule but y on different dates. FIG. 1C shows a flight that departs around the new year, while FIG. 1B shows the flight that departs one week after the first flight. Both flights have the tier structure that we described earlier in this section, but ticket prices in the first flight fluctuate more often.

In terms of pricing strategy, we can divide the airlines into two categories. The first category covers airlines that are big players in the industry, such as United Airlines, and American Airlines. The second category covers smaller airlines that concentrate on selling low-price tickets, such as AirTrans and Southwest. We have found that pricing policies tend to be similar for airlines that belong to the same category. Fares for airlines in the first category are expensive and fluctuate often, while fares for airlines in the second category are moderate and appear relatively stable. However, there are some policies that every airline seems to use. For example, airlines usually increase ticket prices two weeks before departure dates and ticket prices are at a maximum on departure dates.

Data Mining Methods

In this section we explain how we generated training data, and then describe the various data mining methods we investigated: Ripper (W. W. Cohen. Fast effective rule induction. In A. Prieditis and S. Russell, editors, *Proc. Of the 12$^{th}$ International Conference on Machine Learning*, pages 115-123, Tahoe City, Calif., Jul. 9-12, 1995. Morgan Kaufmann), Q-learning (R. S. Sutton and A. Barto. *Reinforcement Learning: An Introduction*. MIT Press, Cambridge, Mass., 1998), and time series (C. W. J. Granger, *Forecasting in Business and Economics*. Harcourt Brace, second edition, 1989; and F. Diebold, *Elements of Forecasting*, South-Western College Publishing, 2$^{nd}$ edition, 2000). We then explain how our data mining algorithm, Hamlet, combines the results of these methods using a variant of stacked generalization (K. M. Ting and I. H. Witten. Issues in stacked generalization. *Journal of Artificial Intelligence Research*, 10:271-289, 1999; D. Wolpert. Stacked generalization. *Neural Networks*, 5:241-259, 1992).

Our data consists of price observations recorded every 3 hours over a 41-day period. Our goal is to learn whether to buy a ticket or wait at a particular time point, for a particular flight, given the price history that we have recorded. All of our experiments enforce the following essential temporal constraint: all the information used to make a decision at particular time point was recorded before that time point. In this way, we ensure that we rely on the past to predict the future, but not vice versa.

Rule Learning

Our first step was to run the popular Ripper rule learning system (W. W. Cohen. Fast effective rule induction. In A. Prieditis and S. Russell, editors, *Proc. Of the 12$^{th}$ International Conference on Machine Learning*, pages 115-123, Tahoe City, Calif., Jul. 9-12, 1995. Morgan Kaufmann) on our training data. Ripper is an efficient separate and conquer rule learner. We represented each price observation to Ripper as a vector of the following features;

Flight number.
Number of hours until departure (denoted as hours-before-takeoff).
Current price.
Airline.
Route (LAX-BOS or SEA-IAD).

The class labels on each training instance were 'buy' or 'wait.'

We considered a host of additional features derived from the data, but they did not improve Ripper's performance. We did not represent key variables like the number of unsold seats on a flight, whether an airline is running a promotion, or seasonal variables because Hamlet did not have access to this information. However, see Section 6 for a discussion of how Hamlet might be able to obtain this information in the future.

Some sample rules generated by Ripper are shown as follows:

IF hours-before-takeoff>=252 AND price>=2223
AND route=LAX-BOS THEN wait
IF airline=United AND price>=360
AND hours-before-takeoff>=438 THEN wait In our domain, classification accuracy is not the best metric to optimize because the cost of misclassified examples is highly variable. For example, misclassifying a single example can cost from nothing to upwards of $2,000. Meta-Cost (P. Domingos, MetaCost: A general method for making classifiers cost-sensitive. In *Proceedings of the Fifth ACM SIGKDD International Conference on Knowledge Discovery and Data Mining*, pages 155-164, San Diego, Calif., 1999. ACM Press) is a well-known general method for training cost-sensitive classifiers. In our domain, MetaCost will make a learned classifier either more conservative or more aggressive about waiting for a better price, depending on the cost of misclassifying a 'buy' as a 'wait' compared with the cost of misclassifying a 'wait' as a 'buy'. We implemented MetaCost with mixed results.

We found that MetaCost improves Ripper's performance by 14 percent, but that MetaCost hurts Hamlet's overall performance by 29 percent. As a result, we did not use MetaCost in Hamlet.

Q-learning

As our next step we considered Q-learning, a species of reinforcement learning. (R. S. Sutton and A. Barto. *Reinforcement Learning: An Introduction*. MIT Press, Cambridge, Mass., 1998.) Reinforcement learning seems like a natural fit because after making each new price observation Hamlet has to decide whether to buy or to wait. Yet the reward (or penalty) associated with the decision is only determined later, when Hamlet determines whether it saved or lost money through its buying policy. Reinforcement learning is also a popular technique in computational finance (J. Moody and M. Saffell. Reinforcement learning for trading systems and portfolios. In KDD, pages 279-283, 1998; J. Moody and M. Saffell. Learning to trade via direct reinforcement. In *IEEE Transactions on Neural Networks*, Vol. 12, No. 4, 2001; J. Moody and M. Saffell. Minimizing downside risk via stochastic dynamic programming. In Y. S. Abu-Mostafa, B. LeBaron, A. W. Lo, and A. S. Weigend, editors, *Computational Finance* 1999, Cambridge, Mass., 2000. MIT Press.)

The standard Q-learning formula is:

$$Q(\alpha,s) = R(s,\alpha) + \gamma \max_{\alpha'}(Q(\alpha',s'))$$

Here, $R(s,\alpha)$ is the immediate reward, $\gamma$ is the discount factor for future rewards, and $s'$ is the state resulting from taking action $\alpha$ in state $s$. We use the notion of state to model the state of the world after each price observation (represented by the price, flight number, departure date, and number of hours prior to takeoff). Thus, there are two possible actions in each state: b for 'buy' and w for 'wait'.

Of course, the particular reward function used is critical to the success (or failure) of Q-learning. In our study, the reward associated with b is the negative of the ticket price at that state, and the state resulting from b is a terminal state so there is no future reward. The immediate reward associated with w is zero as long as economy tickets on the flight do not sell out in the next time step. We set $\gamma=1$, so we do not discount future rewards.

To discourage the algorithm from learning a model that waits until flights sell out, we introduce a "penalty" for such flights in the reward function. Specifically, in the case where the flight does sell out at the next time point, we make the immediate reward for waiting a negative constant whose absolute value is substantially greater than the price for any flight. We set the reward for reaching a sold-out state to be −300,000. This setting can best be explained below, after we introduce a notion of equivalence classes among states.

In short, we define the Q function by $$Q(b, s) = -\text{price}(s)$$

$$Q(w, s) = \begin{cases} -300000 & \text{if flight sells out after } s. \\ \max(Q(b, s'), Q(w, s')) & \text{otherwise.} \end{cases}$$

To generalize from the training data we used a variant of the averaging step described in (S. Mahadevan. Average reward reinforcement learning: Foundations, algorithms, and empirical results. *Machine Learning*, 22(1-3):159-195, 1996). More specifically, we defined an equivalence class over states, which enabled the algorithm to train on a limited set of observations of the class and then use the learned model to generate predictions for other states in the class.

To define our equivalence class we need to introduce some notation. Airlines typically use the same flight number (e.g., UA 168) to refer to multiple flights with the same route that depart at the same time on different dates. Thus, United flight 168 departs once daily from LAX to Boston at 10:15 pm. We refer to a particular flight by a combination of its flight number and date. For example, UA168-Jan7 refers to flight 168 which departs on Jan. 7, 2003. Since we observe the price of each flight eight times in every 24 hour period, there are many price observations for each flight. We distinguish among them by recording the time (number of hours) until the flight departs. Thus, UA168-Jan7-120 is the price observation for flight UA168, departing on January 7, which was recorded on January 2nd (120 hours before the flight departs on the 7th). Our equivalence class is the set of states with the same flight number and the same hours before takeoff, but different departure dates. Thus, the states denoted UA168-Jan7-120 and UA168-Jan10-120 are in the same equivalence class, but the state UA168-Jan7-117 is not. We denote that s and s* are in the same equivalence class by s~s*.

Thus, our revised Q-learning formula is:

$$Q(\alpha,s)=\text{Avg}_{s^*\sim s}(R(s^*,\alpha)+\max_{\alpha'}(Q(\alpha',s')))$$

The reason for choosing −300,000 is now more apparent: the large penalty can tilt the average toward a low value, even when many Q values are being averaged together. Suppose, for example, that there are ten training examples in the same equivalence class, and each has a current price of $2,500. Suppose now that in nine of the ten examples the price drops to $2,000 at some point in the future, but the flight in the tenth example sells out in the next state. The Q value for waiting in any state in this equivalence class will be (−300,000−2,000*9)/10=−31,800, or still much less then the Q value for any equivalence class where no flight sells out in the next state. Thus the choice of reward for a flight that sells out will determine how willing the Q-Learning algorithm will be to risk waiting when there's a chance a flight may sell out. Using a hill climbing search in the space of penalties, we found −300,000 to be locally optimal.

Q-learning can be very slow, but we were able to exploit the structure of the problem and the close relationship between dynamic programming and reinforcement learning (see, R. S. Sutton and A. Barto. *Reinforcement Learning: An introduction*. MIT Press, Cambridge, Mass., 1998) to complete the learning in one pass over the training set. Specifically, the reinforcement learning problem we face has a particularly nice structure, in which the value of Q(b,s) depends only on the price in state s, and the value of Q(w,s) depends only on the Q values of exactly one other state: the state containing the same flight number and departure date but with three hours less time left until departure. Applying dynamic programming is thus straightforward, and the initial training step requires only a single pass over the data. In order to compute averages over states in the same equivalence class, we keep a running total and a count of the Q values in each equivalence class. Thus, the reinforcement learning algorithm just makes a single pass over the training data, which bodes well for scaling the algorithm to much larger data sets.

The output of Q-learning is the learned policy, which determines whether to buy or wait in unseen states by mapping them to the appropriate equivalence class and choosing the action with the lowest learned cost.

Time Series

Time series analysis is a large and diverse subfield of statistics whose goal is to detect and predict trends. In this paper, we investigated a first order moving average model. At time step t, the model predicts the price one step into the future, $p_{t+1}$, based on a weighted average of prices already seen. Thus, whereas Q-learning and Ripper attempt to generalize from the behavior of a set of flights in the training data to the behavior of future flights, the moving average model attempts to predict the price behavior of a flight in the test data based on its own history.

At time $t_1$, we predict the next price using a fixed window of price observations, $p_{t+k+1}, \ldots, p_t$. (In Hamlet, we found that setting k to one week's worth of price observations was locally optimal.) We take a weighted average of these prices, weighting the more recent prices more and more heavily. Formally, we predict that $p_{t+1}$, will be $$\frac{\sum_{i=1}^{k} \alpha(i) p_{t-k+i}}{\sum_{i=1}^{k} \alpha(i)}$$

where α(i) is some increasing function of i. We experimented with different α functions and chose a simple linearly increasing function.

Given the time series prediction, Hamlet relies on the following simple decision rule: if the model predicts that $p_{t+1} > p_t$, then buy, otherwise wait. Thus, our time series model makes its decisions based on a one-step prediction of the ticket price change. The decision rule ignores the magnitude of the difference between $p_{t+1}$ and $p_t$, which is overly simplistic, and indeed the time series prediction does not do very well on its own (see Table 3). However, Hamlet uses the time series predictions extensively in its rules. In effect, the time series prediction provides information about how the current price compares to a local average, and that turns out to be valuable information for Hamlet.

Stacked Generalization

Ensemble-based learning techniques such as bagging (L. Breiman. Bagging predictors. *Machine Learning*, 24:123-140, 1996), boosting (Y. Freund and R. E. Schapire. Experiments with a new boosting algorithm. In *Proceedings of the Thirteenth International Conference on Machine Learning*, pages 148-156, Bari, Italy, 1996. Morgan Kaufmann), and stacking (K. M. Ting and I. H. Witten. Issues in stacked generalization. *Journal of Artificial Intelligence Research*, 10:271-289, 1999; D. Wolpert. Stacked generalization. *Neural Networks*, 5:241-259, 1992), which combine the results of multiple generalizers, have been shown to improve generalizer accuracy on many data sets. In our study, we investigated multiple data mining methods with very different characteristics (Ripper, Q-learning, and time series) so it makes sense to combine their outputs.

We preferred stacking to voting algorithms such as weighted majority (N. Littlestone and M. K. Warmuth. The weighted majority algorithm. *Information and Computation*, 108(2):212-261, February 1994) or bagging (L. Breiman. Bagging predictors. *Machine Learning*, 24:123-140, 1996) because we believed that there were identifiable conditions under which one method's model would be more successful than another. See, for example, the sample rule as follows:

Let TS be the output of the Time Series algorithm,
and let QL be the output of Q-Learning.
IF hours-before-takeoff>=480 AND airline=United
AND price>=360 AND TS=buy AND QL=wait
THEN wait Standard stacking methods separate the original vector representation of training examples (level-0 data in Wolpert's terminology), and use the class labels from each level-0 generalizer, along with the example's true classification as input to a meta-level (or level-1) generalizer. To avoid over-fitting, "care is taken to ensure that the models are formed from a batch of training data that does not include the instance in question" (K. M. Ting and I. H. Witten. Issues in stacked generalization. *Journal of Artificial Intelligence Research*, 10:271-289, 1999).

In our implementation of stacking, we collapsed level-0 and level-1 features. Specifically, we used the feature representation described in the Rule Learning section but added three additional features corresponding to the class labels (buy or wait) computed for each training example by our level-0 generalizers. To add our three level-1 features to the data, we applied the model produced by each base-level generalizer (Ripper, Q-learning, and time series) to each instance in the training data and labeled it with 'buy' or 'wait.' Thus, we added features of the form TS=buy (time series says to buy) and QL=wait (Q-learning says to wait).

We then used Ripper as our level-1 generalizer, running it over this augmented training data. We omitted leave-one-out cross validation because of the temporal nature of our data. Although a form of cross validation is possible on temporal data, it was not necessary because each of our base learners did not appear to overfit the training data.

Our stacked generalizer was our most successful data mining method as shown in Table 3 and we refer to it as Hamlet.

Hand-Crafted Rule

After we studied the data in depth and consulted with travel agents, we were able to come up with a fairly simple policy "by hand." We describe it below, and include it in our results as a baseline for comparison with the more complex models produced by our data mining algorithms.

The intuition underlying the hand-crafted rules is as follows. First, to avoid sell outs we do not want to wait too long. By inspection of the data, we decided to buy if the price has not dropped within 7 days of the departure date. We can compute an expectation for the lowest price of the flight in the future based on similar flights in the training data. (For "similar" flights we used flights with the same airline and flight number.) If the current price is higher than the expected minimum then it is best to wait. Otherwise, we buy.

More formally, let MinPrice(s,t), of a flight in the training set denote the minimum price of that flight over the interval starting from s days before departure up until time (or until the flight seas out). Let ExpPrice(s,t) for a particular flight number denote the average over all MinPrice(s,t) for flights in the training set with that flight number. Suppose a passenger asks at time $t_0$ buy a ticket that leaves in $s_0$ days, and whose current price is CurPrice. The hand-crafted rule is shown as follows:
IF ExpPrice($s_0$,$t_0$)<CurPrice
AND $s_0$>7 days THEN wait
ELSE buy We also considered simpler decision rules of the form "if the current time is less than K days before the flight's departure then buy." In our simulation (described below) we tested such rules for K ranging from 1 to 22, but none of these rules resulted in savings and some resulted in substantial losses.

Experimental Results

In this section we describe the simulation we used to assess the savings due to each of the data mining methods described earlier. We then compare the methods in Table 3, perform a sensitivity analysis of the comparison along several dimensions, and consider the implications of our pilot study.

Ticket Purchasing Simulation

The most natural way to assess the quality of the predictive models generated by the data mining methods described in Section 4 is to quantify the savings that each model would generate for a population of passengers. For us, a passenger is a person wanting to buy a ticket on a particular flight at a particular date and time. It is easy to imagine that an online travel agent such as Expedia or Travelocity could offer discounted fares to passengers on its web site, and use Hamlet to appropriately time ticket purchases behind the scenes. For example, if Hamlet anticipates that a fare will drop by $500, the agent could offer a $300 discount and keep $200 as compensation and to offset losses due prediction errors by Hamlet.

TABLE 3

Savings by Method.

| Method | Savings | Losses | Upgrade Cost | % Upgrades | Net Savings | % Savings | % of Optimal |
|---|---|---|---|---|---|---|---|
| Optimal | $320,572 | $ 0 | $ 0 | 0% | $320,572 | 7.0% | 100% |
| By hand | $228,318 | $35,329 | $ 22,472 | 0.36% | $170,517 | 3.8% | 53.2% |
| Ripper | $211,031 | $ 4,689 | $ 33,340 | 0.45% | $173,002 | 3.8% | 54.0% |
| Times Series | $269,879 | $ 6,138 | $693,105 | 33.0% | −$429,364 | −9.5% | −134% |
| Q-learning | $228,663 | $46,873 | $ 29,444 | 0.49% | $152,364 | 3.4% | 47.5% |
| Hamlet | $244,868 | $ 8,051 | $ 38,743 | 0.42% | $198,074 | 4.4% | 61.8% |

Since Hamlet is not yet ready for use by real passengers, we simulated passengers by generating a uniform distribution of passengers wanting to purchase tickets on various flights as a function of time. Specifically, the simulation generated one passenger for each fare observation in our set of test data. The total number of passengers was 4,488. Thus, each simulated passenger has a particular flight for which they need to buy a ticket and an earnest time point at which they could purchase that ticket (called the "earliest purchase point"). The earnest purchase points, for different simulated passengers, varied from 21 days before the flight to the day of the flight.

At each subsequent time point, Hamlet decides whether to buy a ticket immediately or to wait. This process continues until either the passenger buys a ticket or economy seats on the flight sell out, in which case Hamlet will buy a higher priced business-class ticket for the flight. (It is possible, of course, for business class to sell out as well, in which case Hamlet would have to buy a first-class ticket or re-book the passenger on a different flight. However, business class did not sell out in our simulation.) We defined upgrade costs as the difference between the cost of a business class ticket and the cost of an economy ticket at the earnest purchase point. In our simulation, Hamlet was forced to "upgrade" passengers to business class only 0.42% of the time, but the total cost of these upgrades was quite high ($38,743 in Table 3). (Since we did not collect upgrade costs for all flights, our upgrade costs are approximate but always positive and often as high as $1,000 or more.)

We recorded for each simulated passenger, and for each predictive model considered, the price of the ticket purchased and the optimal price for that passenger given their earliest time point and the subsequent price behavior for that flight. The savings (or loss) that a predictive model yields for a simulated passenger is the difference between the price of a ticket at the earliest purchase point and the price of the ticket at the point when the predictive model recommends buying. Net savings is savings net of both losses and upgrade costs.

Savings

Table 3 shows the savings, losses, upgrade costs, and net savings achieved in our simulation by each predictive model we generated. We also report on the frequency of upgrades as a percentage of the total passenger population, the net savings as a percent of the total ticket price, and the performance of each model as a percent of the maximal possible savings.

The models we used are the following:
Optimal: This model represents the maximal possible savings, which are computed by a "clairvoyant" algorithm with perfect information about future prices, and which obtained the best possible purchase price for each passenger.
By hand: This model was hand-crafted by one of the authors after consulting with travel agents and thoroughly analyzing our training data (see FIG. 7).
Time series: This model was generated by the moving average method described earlier.
Ripper: This model was generated by Ripper.
Q-learning: This model was generated by our Q-learning method.
Hamlet: This model was generated by our stacking generalizer which combined the results of Ripper, Q-learning, and Time series.

Table 3 shows a comparison of the different methods. Note that the savings measure we focus on is savings net of losses and upgrade costs. We see that Hamlet outperformed each of the learning methods as well as the hand-crafted model to achieve a net savings of $198,074. Furthermore, despite the fact that Hamlet had access to a very limited price history and no information about the number of unsold seats on the flight, its net savings were a remarkable 61.8% of optimal. Finally, while an average net savings of 4.4% may not seem like much, passengers spend billions of dollars on air travel each year so 4.4% amounts to a substantial number of dollars.

We believe that our simulation understates the savings that Hamlet would achieve in practice. For close to 75% of the passengers in our test set, savings were not possible because prices never dropped from the earliest purchase point until the flight departed. We report the percent savings in ticket prices over the set of flights where savings was possible ("feasible flights") in Table 4. These savings figures are of interest because of the unrealistic distribution of passengers in our simulation. Because we only gathered data for 21 days before each flight in our test set, passengers "arrived" at most 21 days before a flight. Furthermore, due to the uniform distribution of passengers, 33% of the passengers arrived at most 7 days before the flight's departure, when savings are hard to come by. In fact, on our test data, Hamlet lost money for passengers who "arrived" in the last 7 days prior to the flight. We believe that in practice we would find additional opportunities to save money for the bulk of passengers who buy their tickets more than 7 days before the flight date.

TABLE 4

Comparison of Net Savings (as a percent of total ticket price) on Feasible Flights.

| Method | Net Savings |
| --- | --- |
| Optimal | 30.6% |
| By hand | 21.8% |
| Ripper | 20.1% |
| Times Series | 25.8% |
| Q-learning | 21.8% |
| Hamlet | 23.8% |

Sensitivity Analysis

To test the robustness of our results to changes in our simulation, we varied two key parameters. First, we changed the distribution of passengers requesting flight tickets. Second, we changed the model of a passenger from one where a passenger wants to purchase a ticket on a particular flight to one where a passenger wants to fly at any time during a three hour interval. The interval model is similar to the interface offered at many travel web sites where a potential buyer specifies if they want to fly in the morning, afternoon, or evening.

We used the following distributions to model the earliest purchase point (i.e., the first time point at which passengers "arrive" and need to decide whether to buy a ticket or to wait):
Uniform: a uniform distribution of simulated passengers over the 21 days before the flight's departure date;
Linear Decrease: a distribution in which the number of passengers arriving at the system decreased linearly as the amount of time left before departure decreased;
Quadratic Decrease: a distribution like Linear Decrease, but with a quadratic relationship;
Square Root Decrease: a distribution like Linear Decrease, but with a square root relationship;
Linear Increase: a distribution like Linear Decrease, except that the number of passengers increase as the amount of time left before departure decreased;
Quadratic Increase: a distribution like Linear Increase, but with a quadratic relationship;
Square Root Increase: a distribution like Linear Increase, but with a square root relationship.

Table 6 reports the net savings, as a percentage of the total ticket price, under the different distributions. Hamlet saved more than 2.5% of the ticket price in all cases, and it saved more than any other method on all distributions except the Quadratic Decrease distribution, where it performed slightly worse than the hand-crafted decision rule. Hamlet's savings were above 38% of optimal in all cases.

Table 5 reports on the performance of the different methods under the modified model where a passenger requests a ticket on a non-stop flight that departs at any time during a particular three hour interval (e.g., morning). This different model does not change our results qualitatively. Hamlet still achieves a substantial percentage of the optimal savings (59.2%) and its percentage of upgrades drops to only 0.1%. Finally, Hamlet still substantially outperforms the other data mining methods.

TABLE 5

Performance of algorithms on multiple flights over three hour interval.

| Method | Net Savings | % of Optimal | % Upgrades |
|---|---|---|---|
| Optimal | $323,802 | 100% | 0% |
| By hand | $163,523 | 55.5% | 0% |
| Ripper | $173,234 | 53.5% | 0% |
| Times Series | $262,749 | −81.1% | 6.3% |
| Q-learning | $149,587 | 46.2% | 0.2% |
| Hamlet | $191,647 | 59.2% | 0.1% |

TABLE 6

Sensitivity of Methods to Distribution of Passengers' Earliest Purchase Points.

| Distribution | By hand | Q-Learn | Time Series | Ripper | Hamlet |
|---|---|---|---|---|---|
| Quadratic Decrease | 4.07% | 3.77% | −24.96% | 2.46% | 3.96% |
| Linear Decrease | 4.70% | 4.30% | −26.76% | 4.13% | 5.17% |
| Sqrt Decrease | 4.47% | 4.04% | −29.05% | 4.23% | 5.03% |
| Uniform | 3.77% | 3.37% | −32.55% | 3.83% | 4.38% |
| Sqrt Increase | 3.66% | 3.24% | −34.63% | 4.05% | 4.39% |
| Linear Increase | 3.13% | 2.72% | −36.55% | 3.62% | 3.85% |
| Quadratic Increase | 2.10% | 1.74% | −39.90% | 2.48% | 2.60% |

The numbers reported are the savings, as a percentage of total ticket price, achieved by each algorithm under each distribution. We see that Hamlet outperforms Q-learning, time series, and Ripper on all distributions.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method performed by a computer for providing pricing information for items with use dates, the method comprising:
   providing historical pricing information including offer prices at which a plurality of suppliers have offered to provide items with use dates;
   receiving by the computer a request from a user for pricing information for a requested item with a requested use date;
   for each of the plurality of suppliers of the requested item, obtaining by the computer from the supplier an offer to provide the requested item with the requested use date, each offer including a current offer price at which the supplier is offering to provide the requested item;
   determining by the computer a prediction for a future direction of offer prices for the requested item based on the obtained offers and provided historical pricing information;
   providing by the computer to the user an indication of a current offer price for the requested item and the prediction of the future direction of offer prices for the requested item;
   receiving from the user an indication to accept the offer of a supplier to purchase the item; and
   in response to receiving the indication to accept the offer, directing the item to be purchased from the supplier at the current offer prices of the supplier
   wherein the computer predicts the future direction of offer prices for the requested item provided by the plurality of suppliers and provides that prediction to the user so that the user can decide whether to accept the offer from a supplier at the current offer price or defer accepting an offer based on the prediction of the future direction of the offer prices.

2. The method of claim 1 wherein the use date is a date after which a value for requested item decreases.

3. The method of claim 1 wherein the prediction of future direction indicates whether the offer price is likely to increase or decrease.

4. The method of claim 1 wherein the determining includes determining a prediction for each of the obtained offers and the providing provides the determined prediction for each offer.

5. The method of claim 1 wherein the requested item is not a physical item.

6. The method of claim 1 wherein the use date is a date after which a value for the requested item decreases, wherein the prediction of future direction indicates whether the offer price is likely to increase or decrease, and wherein the determining includes determining a prediction for each of the obtained offers and the providing provides the determined prediction for each offer.

7. The method of claim 6 wherein the requested item is not a physical item.

8. The method of claim 1 wherein the obtained offers includes offers for a substitute item.

9. The method of claim 1 wherein the requested item is an event and the use date is date of the event.

10. The method of claim 1 wherein the determining of the prediction for the future direction is based on factors that affect value of the requested item.

11. A computer system for providing pricing information for items with use dates, comprising:
   a memory storing computer-executable instructions that include:
      a component that accesses historical pricing information including offer prices at which a plurality of suppliers have offered to provide items with use dates;
      a component that receives a request from a user for pricing information for a requested item with a requested use date;
      a component that, for each of the plurality of suppliers of the requested item, obtains from the supplier an offer to provide the requested item with the requested use date, each offer including a current offer price at which the supplier is offering to provide the requested item;

a component that determines a prediction for a future direction of offer prices for the requested item based on the obtained offers and provided historical pricing information;

a component that provides to the user an indication of a current offer price for the requested item and the prediction of the future direction of offer prices for the requested item;

a component that receives from the user an indication to accept the offer of a supplier to purchase the item; and a component that, in response to receiving the indication to accept the offer, directs the item to be purchased from the supplier at the current offer prices of the supplier; and a processor that executes the computer-executable instructions stored in the memory whereby the computer system predicts the future direction of offer prices for the requested item provided by the plurality of suppliers and provides that prediction to the user so that the user can decide whether to accept the offer from a supplier at the current offer price or defer accepting an offer based on the prediction of the future direction of the offer prices.

12. The computer system of claim 11 wherein the use date is a date after which a value for requested item decreases.

13. The computer system of claim 11 including a component that determines a prediction for each of the obtained offers and provides the determined prediction for each offer.

14. The computer system of claim 11 wherein the requested item is an airline ticket.

15. The computer system of claim 11 wherein the use date is a date after which a value for the requested item decreases, wherein the prediction of future direction indicates whether the offer price is likely to increase or decrease, wherein the requested item is an airline ticket, and including a component that determines a prediction for each of the obtained offers and provides the determined prediction for each offer.

* * * * *